United States Patent [19]

Nguyen

[11] Patent Number: 5,638,448

[45] Date of Patent: Jun. 10, 1997

[54] NETWORK WITH SECURE COMMUNICATIONS SESSIONS

[76] Inventor: Minhtam C. Nguyen, 335 Elan Village La., Apt. 217, San Jose, Calif. 95134

[21] Appl. No.: 583,933

[22] Filed: Jan. 11, 1996

Related U.S. Application Data

[63] Continuation-in-part of Ser. No. 547,346, Oct. 24, 1995.

[51] Int. Cl.$^6$ .................... H04L 9/06; H04L 9/32; H04L 9/00
[52] U.S. Cl. .................... 380/29; 380/9; 380/21; 380/23; 380/25; 380/37; 380/43; 380/49
[58] Field of Search .................... 380/9, 21, 23, 380/25, 29, 37, 43, 49, 50, 59

[56] References Cited

U.S. PATENT DOCUMENTS

| | | | |
|---|---|---|---|
| 4,227,253 | 10/1980 | Ehrsam et al. | 375/2 |
| 5,060,263 | 10/1991 | Bosen et al. | 380/25 |
| 5,073,852 | 12/1991 | Siegel et al. | 395/700 |
| 5,111,504 | 5/1992 | Esserman et al. | 380/21 |
| 5,136,716 | 8/1992 | Harvey et al. | 395/800 |
| 5,142,622 | 8/1992 | Owens | 395/200 |
| 5,220,655 | 6/1993 | Tsutsui | 395/325 |
| 5,226,172 | 7/1993 | Seymour et al. | 395/800 |
| 5,239,648 | 8/1993 | Nukui | 395/600 |
| 5,241,599 | 8/1993 | Bellovin et al. | 380/21 |
| 5,261,070 | 11/1993 | Ohta | 395/425 |
| 5,263,165 | 11/1993 | Janis | 395/725 |
| 5,268,962 | 12/1993 | Abadi et al. | 380/21 |
| 5,301,247 | 4/1994 | Rasmussen et al. | 380/43 |
| 5,311,593 | 5/1994 | Carmi | 380/23 |
| 5,323,146 | 6/1994 | Glaschick | 340/825.34 |
| 5,349,642 | 9/1994 | Kingdon | 380/25 |
| 5,369,707 | 11/1994 | Follendore, III | 380/25 |
| 5,373,559 | 12/1994 | Kaufman et al. | 380/30 |
| 5,375,207 | 12/1994 | Blakely et al. | 395/200 |
| 5,392,357 | 2/1995 | Bulfer et al. | 380/33 |
| 5,416,842 | 5/1995 | Aziz | 380/30 |
| 5,418,854 | 5/1995 | Kaufman et al. | 380/23 |
| 5,559,883 | 9/1996 | Williams | 380/25 X |

OTHER PUBLICATIONS

Bruce Schneier, *Applied Cryptography* (second edition), New York, NY, John Wiley & Sons, Inc, 1996, pp. 298–301.

*Primary Examiner*—Bernarr E. Gregory
*Attorney, Agent, or Firm*—John C. Smith

[57] ABSTRACT

A system which uses three way password authentication, and s$^3$DES to encrypt different portions of a logon packet with different keys based on the nature of the communications link. Nodes attached to a particular LAN can have one level of security for data transfer within the LAN while data transfers between LANs on a private network can have a second level of security and LANs connected via public networks can have a third level of security. The level of security can optionally be selected by the user. Data transfers between nodes of a network are kept in separate queues to reduce queue search times and enhance performance. Each session maintains its own key dependent s$^3$DES S-boxes to enhance security.

20 Claims, 15 Drawing Sheets

NETWORK WITH SECURE COMMUNICATIONS SESSIONS

CROSS-REFERENCE TO RELATED APPLICATIONS

This application is related to and is a C.I.P. of the commonly owned copending application entitled Network with Secure Communications Sessions, filed Oct. 24, 1995, bearing U.S. Ser. No. 08/547,346 and naming Minhtam C. Nguyen, the named inventor herein, as sole inventor, the contents of which is specifically incorporated by reference herein in its entirety.

BACKGROUND OF THE INVENTION

1. Technical Field

The present invention relates to computer network security. In particular, it relates to networks which use dynamic packet headers and multiple levels of packet encryption to transfer data to and from a remote server or to and from another node in the local network.

2. Background Art

The development of small independent systems such as personal computers has provided several benefits to users. By providing each user with their own processor and data storage, personal computers provide consistent performance and data security. A cost of these benefits is the inconvenience which results from the inability to easily access data by other members of an organization.

The use of mainframe systems, and the later development of alternative systems such as LANs (Local Area Networks) and servers reduces the inconvenience of making data available to all members of an organization, but results in unpredictable performance, and more importantly results in exposure of sensitive data to unauthorized parties. The transmission of data is commonly done via packet based systems which have user ID and password information in a header section. Interception of a packet with header information allows the intercepter to learn the user ID and password which will in turn allow future penetration of the user's system and unauthorized access to the user's data. It would be desirable to transmit user identification and password information in a manner which would be indecipherable to an unauthorized interceptor.

Data security is endangered not only by access by outside parties such as hackers, industrial spies, etc, but also to inadvertent disclosure of data to unauthorized members of the organization. For example, data exchange at certain levels of management may cause problems should the information be disclosed to the general employee population. Likewise, the transmission of personal information such as banking codes over networks has exposed individuals using online financial systems to the possibility of fraudulent access to their funds by third parties.

In addition to data security, the use of network systems such as LANs has created performance problems due to the queuing of requests from multiple locations and the unpredictable delays associated with queuing fluctuations. It would be advantageous if a system could provide not only data security, but also more consistent performance.

The prior art has failed to provide network systems which ensure that access to data is restricted to authorized parties while at the same time providing more consistent performance.

SUMMARY OF THE INVENTION

The present invention solves the foregoing problems by providing a system which uses three way password authentication, encrypting different portions of a logon packet with different keys based on the nature of the communications link. Nodes attached to a particular LAN can have one level of security for data transfer within the LAN while data transfers between LANs on a private network can have a second level of security and LANs connected via public networks can have a third level of security. The level of security can optionally be selected by the user. Data transfers between nodes of a network are kept in separate queues to reduce queue search times and enhance performance. Each communication session is assigned a key dependent S-boxes table for a high level of security.

BRIEF DESCRIPTION OF THE DRAWINGS

FIG. 5A is the memory layout used for TCP/IP and NetBIOS. FIG. 5B is the memory layout used by modem or RS-232 communications systems.

DESCRIPTION OF THE PREFERRED EMBODIMENT

Figure 1:
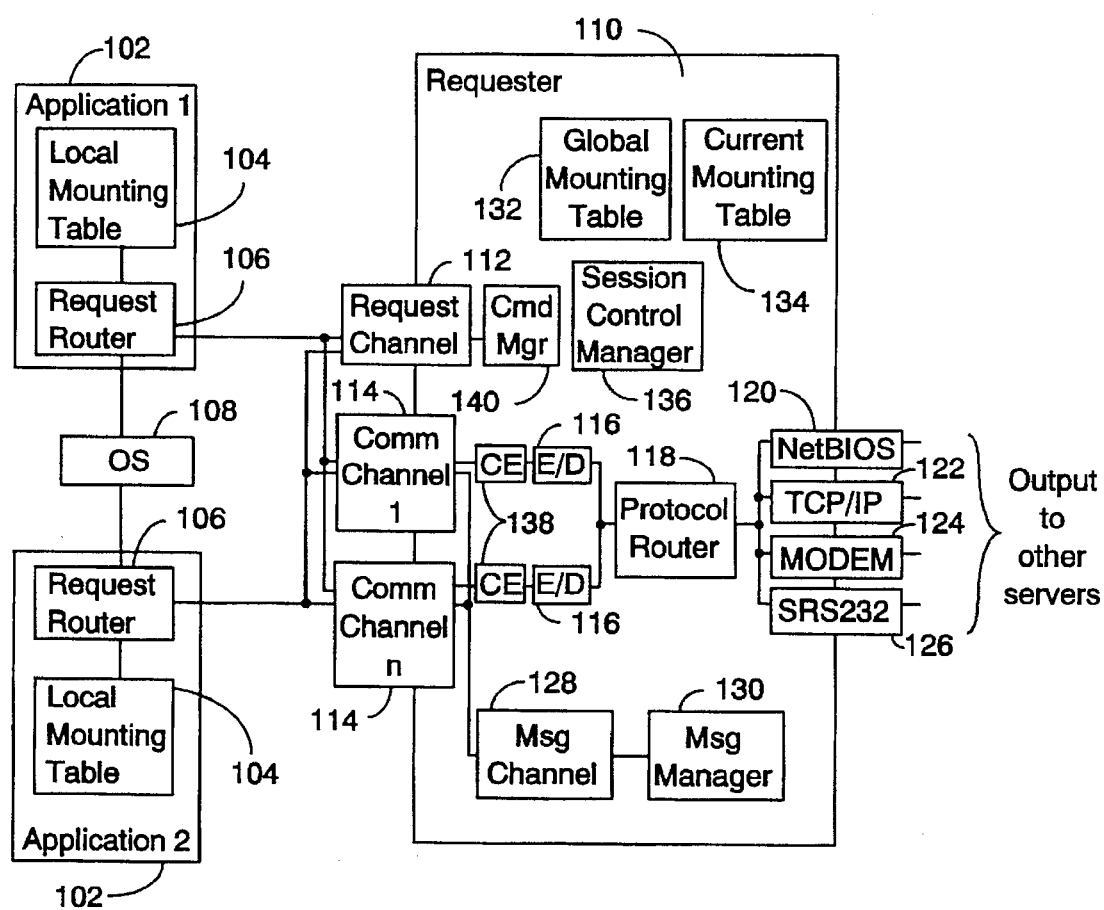
FIG. 1 is a diagram showing the connection between applications and the requester in a local system.

Prior to a detailed description of the figures, a general discussion of the operation of the preferred embodiment follows. A network can take a variety of forms. For example, it can be two personal computers communicating via modem; it can be a single LAN system within a particular facility; it can be a remote server or mainframe system with communications links to individual terminals or personal computers; it can be a network of LANs or other servers each communicating with one another or through one another; or it can be any of the foregoing systems which use not only dedicated communications lines, but also non-dedicated communications (i.e. public networks such as the Internet) through a "firewall". The use of the term firewall herein refers to the requirement for increased levels of security to avoid the possibility of unauthorized data access by parties outside of the organization. Likewise, a machine in the network can act as a client or a server depending on the nature of the data transfer.

In the preferred embodiment, communication between a client and a server is as follows. The server waits for connection requests from clients on the network. The server can be started with one or more supported protocols to enable support of a variety of client types on the network. For example, the server protocols can include, among others, NetBIOS, TCP/IP, modem and RS-232. All of the foregoing protocols are well known in the art.

When a user on a client machine wishes to initiate a data transfer or other function, the client application activates a requester to access resources in the network. When the server receives a request from a client application, it activates a thread to process the request. A thread is an execution unit of an operating system. Operating systems used for this type of system are Microsoft Windows 95 (trademark of Microsoft Corporation), Microsoft Windows NT (trademark of Microsoft Corporation), IBM OS/2 (trademark of IBM Corporation). These systems may use multiple session protocols such as NetBIOS and TCP/IP or single session protocols such as modem or RS-232.

In single session protocols such as modem and RS-232, the same thread is used to process the request from a client since a serial port can act a server or client, but cannot simultaneously act as a server or client. Multiple session protocols create a new thread, referred to as an original thread, and wait for a request from a client. When a request is received, the thread is referred to as a server processing thread which is used to process the client logon.

After the logon is successfully completed, the server processing thread creates a packet queue and a packet thread to receive incoming packets and place them in the packet queue. The server then waits for packets to arrive. On the client side, the client creates a session write thread to initiate contact with the server. In addition, the client creates a second thread which is referred to as the session read thread. This thread is used to receive packets sent from the server to the client.

To use resources on the network, users must first logon the server to prove their identity. A logon request is sent from the client's logon application to the requester on the client computer. Before logon data can be exchanged between the applications and the requester, a command manager is created by the requester to accept application requests. The command manager is responsible for housekeeping requests within the client computer.

In the preferred embodiment, the logon procedure uses a three way authentication to prevent the password from being transferred over the computer and also to allow both the client and the server to authenticate each other. In addition, the authentication procedure prevents unauthorized penetration of the system security by detecting the replaying of packets by third parties.

The three way authentication system encrypts the very first logon packet with different keys for each part of the packet as follows.

The first step takes place at the client computer as follows.

1- The client generates a 32 bit random number value which is concatenated to a predefined 32 bit constant to form a 64 bit value R.
2- The CRC signature C1 of the 64 bit value R and the user ID is calculated. This signature value allows detection of packet manipulation.
3- The 64 bit value R is used as a DES key to encrypt the user ID. This makes the user ID look random for each logon packet.
4- The client generates a 192 bit key K from the server name to encrypt the 64 bit value R.
5- The client generates a key Ka from the user ID and password using a one way hash function such as the Secure Hash Standard (SHS) specified in the Federal Information Processing Standards Publication 180 (FIPS PUB 180).
6- The client generates a random number Ra, calculates its CRC signature C2, and encrypts them with the signature C1 using the key Ka. This signature is used to validate the key Ka by the server.

The second step in the process takes place at the server. When the server receives the first logon packet it decrypts the packet as follows.

1- The server generates a key K2 from its machine name and the SHS to decrypt the packet header for identification. If the packet header does not contain the predefined constant, the user is unauthorized. This occurs when an unauthorized user tries to access the server over the phone line but does not know the server name (since the phone number is a public record but the server name is private).
2- If the user is authorized, the server uses the decrypted 64 bit value R in the packet header as a key to decrypt the user ID.
3- The server then uses the user ID to search a database for an access record. If the access record cannot be found, the user has entered an invalid ID and the session is terminated. If the access record is found, the server verifies if the user is allowed access to network resources at this date and time.
4- If access date and time are verified, the server retrieves an associated one way hashed password Kb from an encrypted password file to decrypt the random number Ra and the CRC signatures. The password file is encrypted with a key Kk which is selected by the system administrator at installation.
5- The random numbers Ra and the CRC signatures are then decrypted. The server calculates the CRC signature of the packet header, the user ID and the random number Ra. If the calculated signatures match the decrypted signatures C1 and C2 stored in the packet, and if password Ka matches Kb, the server manipulates the client random number Ra with a predefined formula, generates a random number Rb, and encrypts both random numbers Ra and Rb with the password Kb before sending the first logon response packet to the client.

The third step in the process takes place at the client computer as follows.

1- The client decrypts the first logon response packet.
2- The client manipulates the random number Ra with the predefined formula and compares it with the one returned from the server. If the numbers match, the client knows that it is connected to the correct server, not a fraud server from which an eavesdropper has captured transmissions from the previous logon and is echoing packets back to the client computer.
3- The client manipulates random number Rb with another predefined formula and concatenates it with the client's initiating data (i.e., the client initial packet sequence number, the encryption and compression mode for the session, and the operating system platform ID) to form a second logon packet. The operating system platform ID is useful for selecting protocols and data formats when a particular client or server is communicating with systems that may have any one of a variety of operating system software programs running. The client would typically request encryption and compression mode for the session. However, the server may indicate that the particular modes requested are not available.

4- The client then encrypts the second logon packet and sends it to the server.

The fourth step in the process takes place at the server computer as follows.

1- The server decrypts the second logon packet.

2- The server manipulates the random number Rb with the same predefined formula used by the client and verifies if the random numbers are matched. If the random numbers match, then the server knows it is communicating with an authorized client and that the first logon packet was not a replayed packet.

3- The server saves the client initiating data, generates a session key Ks and an initialization vector IV. In the preferred embodiment, Ks and IV are generated using a formula similar but more secure than the one specified in Appendix C of the ANSI X9.17 standard.

4- Ks and IV are sent to the client along with the server initiating data (i.e., the server initial packet sequence number, supported and/or approved encryption and compression modes for the session, and the server operating system platform ID).

The client and server initial packet sequence numbers are used to detect packet deletion and insertion for data exchanged after the logon procedure.

The fifth step in the process takes place at the client computer as follows.

1- The second logon response packet is decrypted by the client.

2- The client encrypts Ks and IV with its own key and saves them in memory for future communication with the server. The logon procedure completes here.

After the logon procedure is successfully completed, all packet headers are encrypted using the session key Ks and the IV. The packet headers are encrypted to prevent intruders from deleting, inserting, modifying, and/or replaying the packets which may have been captured while data was exchanged over communication lines.

For ease of illustration, the following symbols can be used to illustrate the logon process:

Where:
  C = a client
  S = a server
  E = a symmetric cryptosystem such as DES
  K = an encryption key generated from the server name
  R = a 32 bit random number concatenated with a predefined constant
  Ka = a 192 bit key one way hashed from the user ID and password
  Ra = a 64 bit random value generated by C
  f( ) = a hash function such as CRC to calculate the signature
  g( ) = a hash function such as CRC to calculate the signatures
  UID = user IDs
  Kb = a 192 bit one way hashed key retrieved from a database
  ha( ) = a hash function to manipulate the random number Ra
  Rb = a 64 bit random value generated by S
  hb( ) = a hash function to manipulate the random number Rb
  Dc = client initial data
  IV = an initial chaining vector for encryption
  Ks = a session encryption key
  Ds = server initial data
  R'a = ha(Ra)
  R'b = hb(Rb)

The logon procedure may be listed as:
  1. C to S: EK(R)+EKa(Ra,f(Ra,g(R,UID) )+ER(UID)
  2. S to C: EKb(R'a,Rb)
  3. C to S: EKa(R'b,Dc)
  4. S to C: EKb(IV,Ks,Ds)

An important advantage of the authentication procedure used by the preferred embodiment is that both the client and the server verify each other as legitimate without sending the password. In addition, the use of a second set of logon packets which contain different encrypted random numbers precludes access by an unauthorized intruder who merely replays intercepted packets.

The heart of this authentication procedure is in the middle part of the logon packet, which contains the random number Ra and the CRC signatures. Since the CRC signature of the random number Ra is encrypted and sent along with the logon packet, the server can authenticate the user right on the first logon packet. The manipulation of the random numbers Ra and Rb in the challenge-response fashion is to help the server defeat the replaying of the logon packet and to allow the client to authenticate the server and to defeat packet replaying as well.

The 32-bit random number in the packet header is used to make the packet header and the user ID look different for every logon packet. The one-way hashed server name is used as a key to quickly detect invalid logon packets before searching the database. This case may occur frequently when the modem protocol is activated to wait for data transferred over a telephone line (i.e., a wrong number is dialed by accident or a call generated by a manual or automated telemarketing company is being received).

In addition, the server name is isolated from the user ID and password when creating a one-way hashed password to allow the portability of the database. For example, when a business grows, another server may be needed at another location and the database can be easily transferred to the new server. Of course, it would be less time-consuming to delete unauthorized users from the database than to add authorized users to the new one. To better protect the valuable information in the database, a password is required before access to the database is granted. More important, the database can be shared among servers. For example, a server Sb can receive the first logon packet and forward the user ID to a database server Sc within a private network for verification. If an access record is found and the user can access the server Sb at this date and time, the database server Sc returns the encrypted one-way hashed password Kb to the server Sb. The server Sb then continues the challenge-response as if the password Kb is returned from a local database. Note that the database server Sc can encrypt the one-way hashed password Kb with the session key defined for communication between the server Sb and Sc before sending it across the private network is security is desired.

In comparison to prior art systems, the design of this invention provides the server a better opportunity to resynchronize itself if the first logon packet is invalid since the receiver of the authenticating packet is in control of what is next, not the sender. On the other hand, in the prior art the sender is in control of what is next. For example, the sender generates a public key, encrypts it with a shared secret key and sends it to the receiver. If the secret key is invalid, the receiver cannot detect it. Thus, a certain number of packets must be received before the receiver can resynchronize or the receiver might have to use a timeout to resynchronize itself.

Finally, the logon protocol of the preferred embodiment is more suitable for a client/server distributed environment, because this logon protocol allows both client and server to authenticate each other without sending the user password across the communication media and prevent intruders from deleting, inserting, modifying, or replaying the logon packets. In addition, if the logon procedure fails at any point, the server releases all resources and destroys the connection without sending the response packet at that point, i.e., if the user enters a wrong server name in the very first logon packet, nothing is sent out from the server to prevent the user, a potential intruder, from knowing anything about the server. Note that this mutual authentication technique requires the client machine to have a local CPU so that the password will not be transmitted over the network before being encrypted.

The client can now perform a mounting procedure to link a network resource on the server to a virtual disk or it can identify a network resource with the following format \\servername\netname. The communication protocol selected at logon is used for communication between a particular client and the server. This method allows communication between a client and network domains, between a network domain and other network domains using multiple communication protocols. Therefore multiple clients can communicate with a single server, each client using a different protocol if desired. Also a single client can communicate with multiple servers, also using different protocols for each server.

Figure 2:
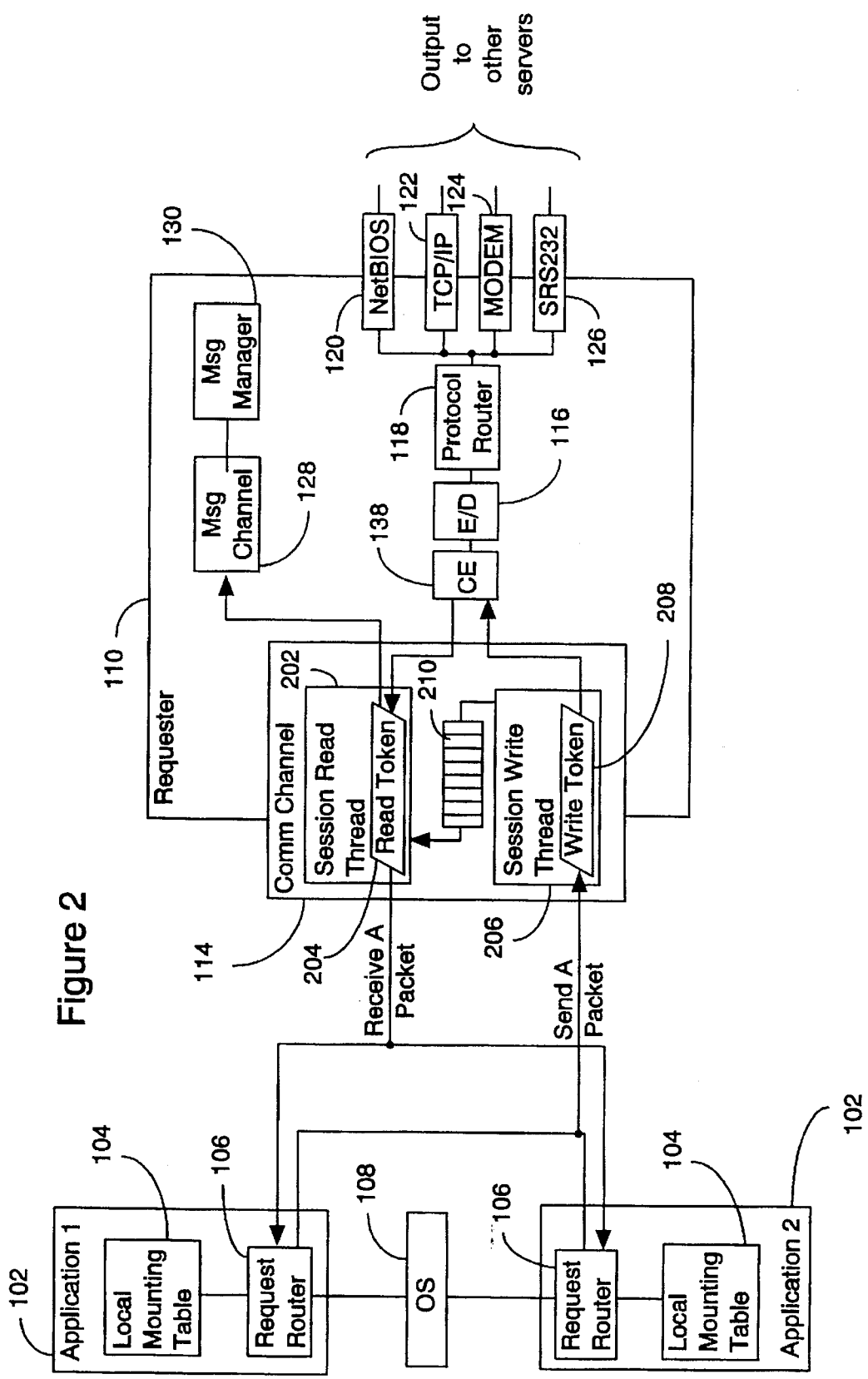
FIG. 2 is the diagram of FIG. 1 with a more detailed view of the requester.

Referring to FIGS. 1 and 2, these figures illustrate the interconnection between a client and a server. FIG. 2 is a more detailed view of the system of FIG. 1.

To perform a file transfer operation, an application 102 calls a request router 106. The request router first verifies if the application 102 requests a local or remote resource. This verification is performed using a local mounting table 104 which the request router 106 obtains from the requester 110 when the application 102 is first started.

If the resource is local, the request router 106 calls a local system function call to perform the request and returns the control to the application 102. However, if the resource is remote, the request router 106 first searches its local list to see if the needed communication handle is already stored in the list. This communication handle contains information of the read 204 and write 208 tokens (shown in FIG. 2) and their associated resources. If the communication handle is not found in the local list, the request router 106 sends a message to the requester 110 over the request channel 112 to obtain the handle. Once the handle is obtained, the request router 106 creates a response signal, i.e., a return address, requests the ownership of the write token 208, stores the response signal into the packet header, builds a packet based on the application's 102 request into the write token 208, and signals the session write thread 206 of the communication channel 114 that there is a packet to send.

If the application data is larger than the packet capacity, the request router 106 can send multiple packets in a series at this point. After the packet is sent to the server, the request router releases the write token for use by another thread in the same process or a different process. If the packet was sent to the server successfully, the request router 106 waits for the corresponding response packets, i.e., a packet can cause multiple response packets returned from the server.

When a response packet arrives, the session read thread uses the response signal to tell the corresponding request router that its response packet has come and is available in the read token. At that time, the read token is accessed exclusively by the designated request router. The router then transfers data in the response packet directly to the application's buffers and signals the session read thread 202 of the communication channel 114 that the read token 206 is no longer in use so that the session read thread 202 can re-use the read token 206 for other incoming packets. Finally, after all response packets of a request packet have arrived, the request router 106 destroys the response signal and returns control to the application 102. The final response packet is determined by a bit in the packet attribute.

The request router 106 sends a message to the command manager of the requester 110 to request the communication handle containing information of the read 204 and write 208 tokens and their associated resources. If the handle already exists, it is passed to the request router 106 immediately after the requester 110 increments the access count of the handle. However, if the handle does not exist at that time, the requester 110 will load the appropriate communication library, allocate the tokens 204, 208 and their associated resources, create a communication channel consisting of a session write thread 206 to perform auto-logon, create a session read thread 204 for the communication channel 114 if auto-logon is successful, and increment the access count of the handle before passing it to the request router 106.

After receiving the handle, the request router 106 saves the handle for use during the entire lifetime of the application. When the application 102 terminates, the request router 106 will signal the requester 110 of the event so that it can decrement the access count of the handle. When the access count is zero for a certain period of time, the session manager of the requester 110 will drop the communication session, release the tokens 204, 208 and their associated resources, and unload the communication library. Thus, this method allows resources to be allocated upon demand and released when no longer in use. Furthermore, the request router 106 can translate and format data in the application timeslices while the requester 110 is communicating with communication devices 120, 122, 124, 126 to better use the CPU time.

The request router 106 can also perform any preparation necessary to transfer the application 102 request to the requester 110 before requesting the ownership of the write token 208 to reduce the time it takes to access the write token 208. In addition, the request router 106 remembers resources for one application 102 at a time. Thus, it reduces the time to search for the needed information. With this method of sending and receiving packets, data can be exchanged asynchronously between a client and a server with minimum resources in a minimum time. In addition, request packets can be accumulated on the server for processing while the previous response packet is processed by the communication devices 120, 122, 124, 126 or traveling over the network.

Message channel 128 and message manager 130 are used to control system messages transmitted in the system. Current mounting table 134 and global mounting table 132 are used to identify usage of system resources. The session control manager is used to control each session between a client and a server.

In order for the Requester 110 to perform a secure automatic logon after the Session Control Manager 136 has dropped a session due to being idle, the Requester 110 must save user ID and password in the Global Mounting Table 132. However, not the original password is stored in the table; but the one-way-hashed key Ka generated from the user ID and password is saved. This key Ka is encrypted with another key generated randomly every time the Requester 110 is started to further protect it. The original password is erased from memory immediately after it is used to generate the key Ka.

When an application need to communication with the remote server, the request router 106 will download the Current Mounting Table 134 into the Local Mounting Table 104 in the application's process space by sending a download request to the Command Manager 140 of the Requester 110. The name of the remote server can now be retrieved from the Local Mounting Table 104 by the Request Router 106. This remote server name is used to request a communication handle from the Requester 110.

Figure 5A:
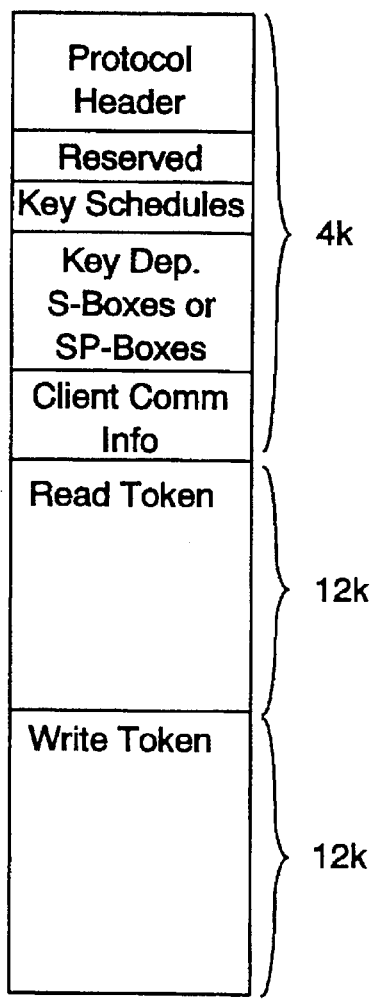
FIGS. 5A–B are diagrams showing the memory layout of entries in the packet queue.
Figure 5A:
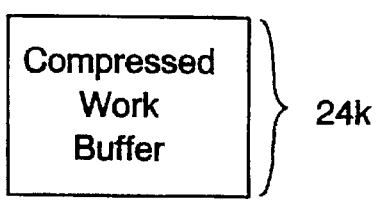
Figure 5B:
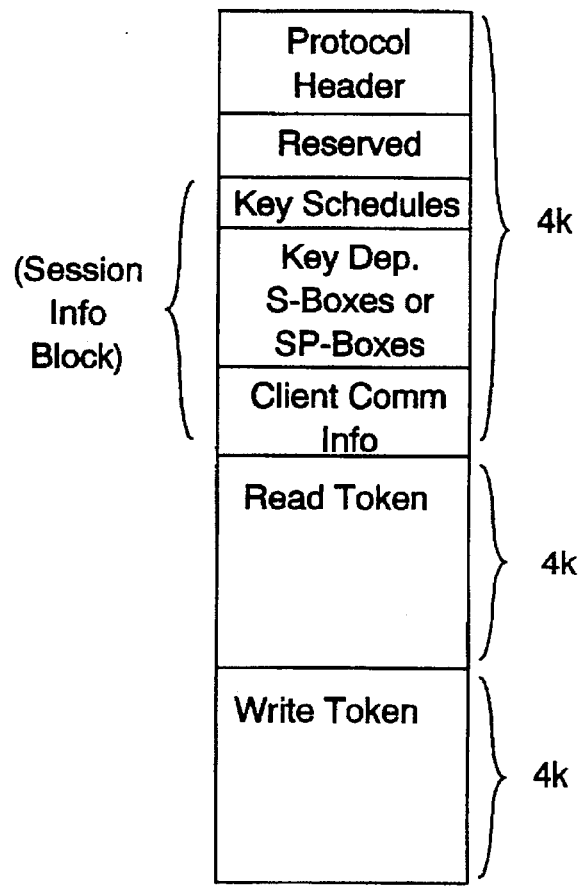
Figure 5B:
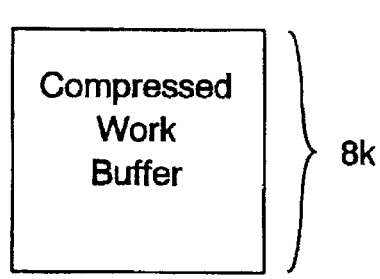

When the Requester 110 performs automatic logon due to a request from a Request Router 106 for a communication handle, the Command Manager 140 searches the Global Mounting Table 132 to find an appropriate server name. If the server name cannot be found, the user has not performed logon manually. However, if the server name is found, the Command Manager 140 will create a Session Write Thread 206 and its associated resources, decrypt the encrypted key Ka and store logon information such as the user ID, the key Ka, and the server name into the Session Info Block as shown in FIG. 5A–B. The auto-logon procedure is then performed by the Session Write Thread 206. After the logon procedure is successfully completed, the Session Write Thread 206 will automatically create the Session Read Thread 204 as described earlier. A return code is then returned to the Command Manager 140 of the Requester to indicate success or failure. If the auto-logon is successful, the Requester 110 returns the communication handle to the Request Router 106. Otherwise, an error code is returned to the Request Router 106. Compression engines (CE) 138 are used to compress data for performance reasons.

If the user has selected compression for the communication session, a compression work buffer will be allocated by both the client and server during the logon procedure. Therefore, minimum resources are allocated for better performance, because the compression work buffer is only allocated when it will be used.

Figure 3A:
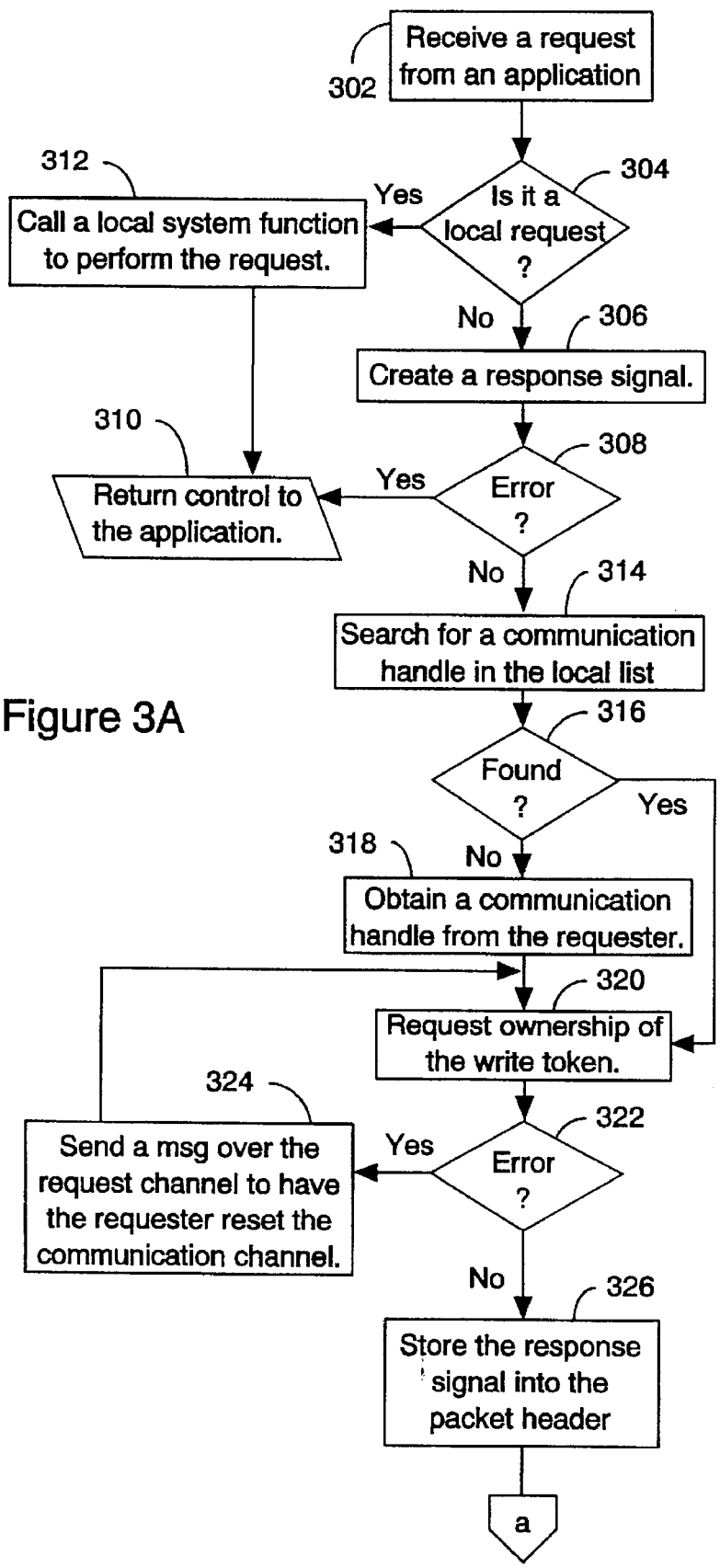
FIGS. 3A–B are a flow diagram illustrating data transfer between the application and requester of the preferred embodiment.
Figure 3B:
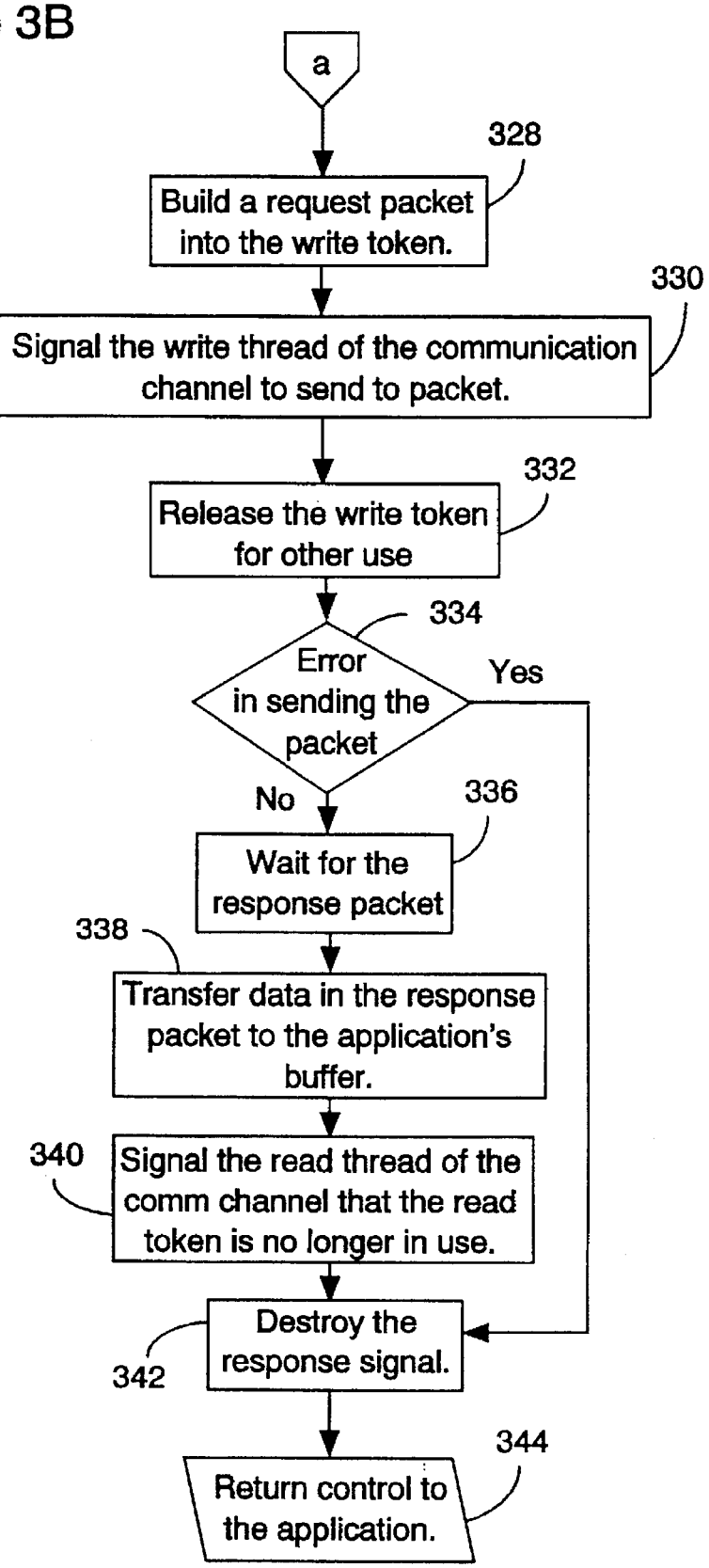

FIG. 3A and B is a flowchart which illustrates the transfer of information in a session after the logon procedure has completed. When a resource request 302 is made, the system 304 first tests to see if it is for a local resource 304. If so, a local function is called 312 and control is returned 310 to the application. If it is not a local resource, the system creates a response signal 306. If the response signal 306 cannot be created, control is returned to the application. If it is, then the local list is searched 314 for the communication handle. If the communication handle is not found 316, a communication handle is obtained 318 from the requester and then ownership if the write token is requested 320. However, if the communication handle is found 316, then ownership if the write token is immediately requested 320.

If no error occurs when the request for ownership of the write token is made 322, then the response signal is stored in the packet header 326, a request packet is built into the write token 328, the write thread sends the packet, and the write token is released 332. If an error is detected when the packet is sent, the response signal is destroyed 342 and control is returned 344 to the application. If no errors occur during packet transmission 344, then the system waits 336 for the response packet, the data in the response packet is transferred 338 into the application's buffer, the read token is released 340, the response signal is destroyed 342 and control is returned 344 to the application.

Figure 4C:
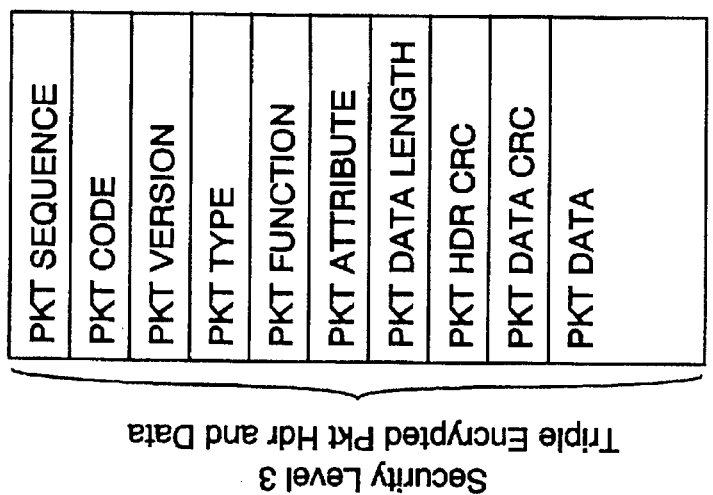
FIGS. 4A–C are diagrams of the memory layout of packet headers used in the preferred embodiment.
Figure 4B:
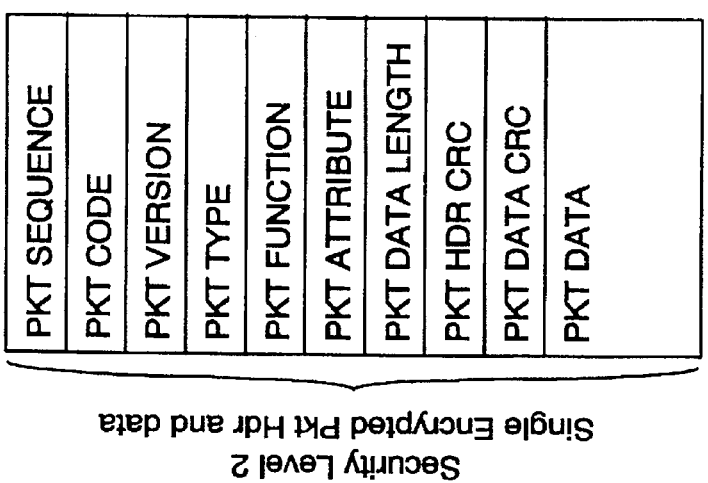
Figure 4A:
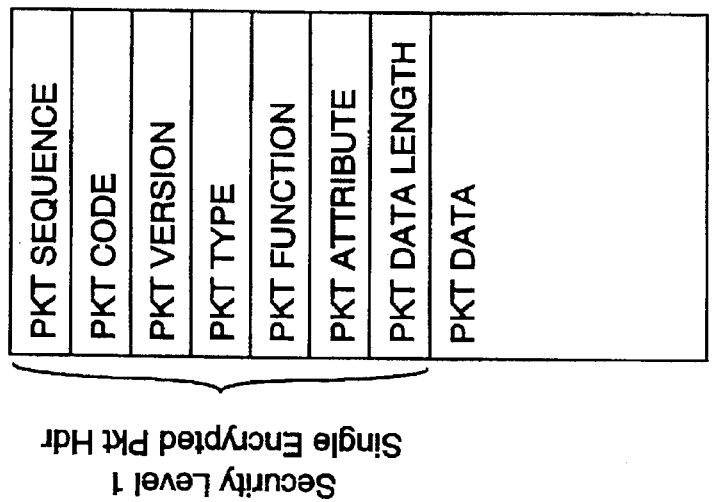

FIGS. 4A–C illustrate the memory layout of the packets used in the preferred embodiment. FIG. 4A illustrates a packet as encrypted by security level 1. In security level 1, the packet header is encrypted using single $s^3$DES encoding. This level of security incurs the least amount of overhead and is preferably used in more secure environments such as LANs. However, if the remote client or server is outside the U.S., then the standard DES is used with a 40 bit key to weaken security to comply with U.S. law.

FIG. 4B illustrates a packet as encrypted by security level 2. In security level 2, the packet header and data are encrypted using single $s^3$DES encoding. This level of security incurs slightly increased overhead as compared to security level 1, but provides an increased level of security for less secure environments such as wide area networks.

FIG. 4C illustrates a packet as encrypted by security level 3. In security level 3, the packet header and the data are encrypted using triple $s^3$DES encoding. This level of security incurs the most overhead as compared to security levels 1 and 2, but provides the highest level of security for insecure environments such as public telephone networks or the Internet.

To protect data exchanged over communication sessions, the preferred embodiment provides two different encryption schemes available to the user at logon. The first scheme is the single $s^3$DES and the second scheme is the triple $s^3$DES similar to the one specified in the ANSI X9.17 and ISO 8732 standards but with 192-bit keys. In addition, the preferred embodiment applies the standard Cipher Block Chaining mode specified in the FIPS PUB 81 to better protect the data. Once an encryption scheme is selected, data exchanged over all sessions connected to a network domain are encrypted regardless of the communication protocols being used by the sessions. The price to paid for the encryption is minimum anyway since the preferred embodiment encrypts 500,000 bytes per second when running on a Pentium 66MHz processor. The operating system used can be any suitable personal computer operating system such a Microsoft (TM) Windows 95 (TM), IBM (TM) OS/2 Warp (TM), Unix, etc. If the server is a large system, any one of a number of suitable mainframe operating system software may be used.

In addition to the above encryption schemes, the preferred embodiment employs a dynamic packet header technique to provide extra securities based on the security level selected by the user at logon. If a security level 2 is selected, the packet header and data are encrypted with $s^3$DES and the packet header is changed to 24 bytes to carry the CRC signatures of the packet header and data for authentication. However, if a security level 3 is selected, the packet header and data are encrypted with $s^3$DES using three different keys. Finally, if security level 1 is selected, the packet header remains at 16 bytes and no signature is verified for a better performance but the packet header is encrypted with $s^3$DES to provide security against other threads. Thus, thanks to the dynamic packet header technique, a user can setup different types of firewalls wherever he needs them. For instance, the user can connect to his office from his home using security level 2 and setup his office machine to connect to another server within his organization using a lower security level to gain a better performance. However, if performance is critical and the network is relatively secure, security level 1 can be changed such that no encryption occurs for the packet header.

In order to provide better security, the preferred embodiment allows the user to select if the data should stay in its encrypted form so that only authorized personnel can view the data. This is important for sensitive business data, personnel data, etc. Of course, the key to decrypt the data must be agreed to ahead of time or exchanged over some secured channels to protect the secrecy of the key.

Of course, those skilled in the art will recognize that the user could also have the capability of instructing the system that no encryption will be used. In this case, no encryption would represent a fourth security level (security level 0). Security level 1–3 having been discussed in regard to FIG. 4.

FIGS. 5A–B illustrate the packet queue structure used in the preferred embodiment. FIG. 5A illustrates the TCP/IP and NetBIOS communications structure and FIG. 5B illustrates the modem and RS-232 communications structure. The compressed buffer is a work buffer used to compress data prior to transmission. A packet header is placed at the beginning of the read token and at the beginning of the write token. In the preferred embodiment, the read and write tokens are stored in shared memory.

Figure 6:
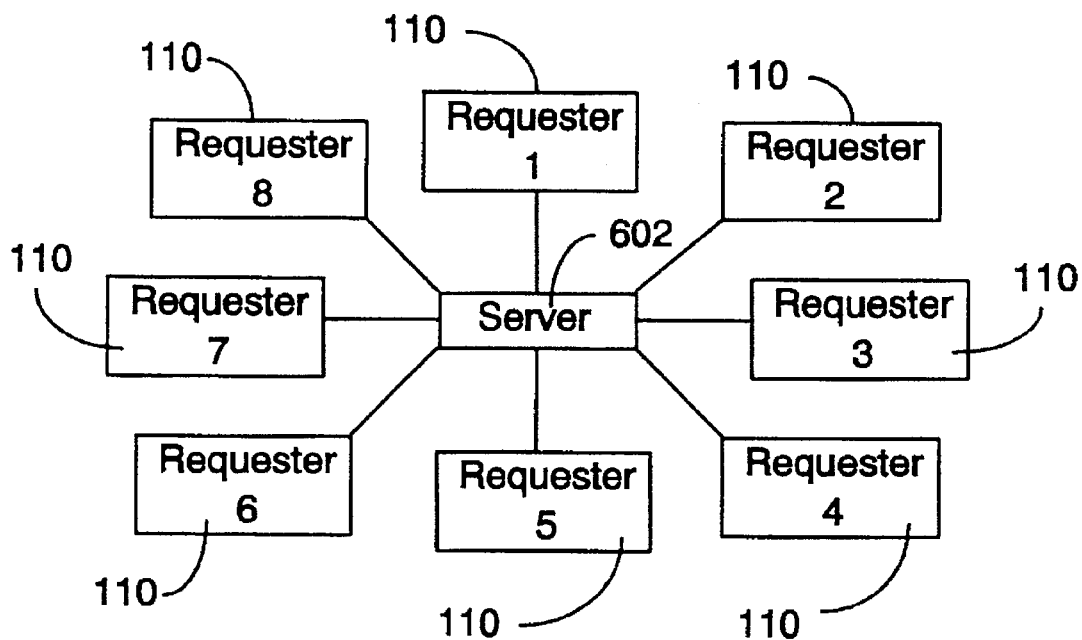
FIG. 6 is a diagram of a multi-requester system with a single server.

FIG. 6 illustrates a configuration in which multiple requesters 110 communicate with a single server 602.

Figure 7:
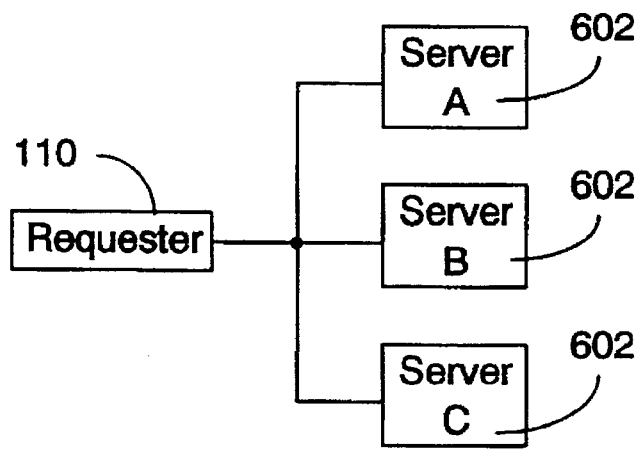
FIG. 7 is a diagram illustrating a single requester attached to three servers.

FIG. 7 illustrates a configuration in which a single requester 110 communicates with multiple servers 602.

Figure 8:
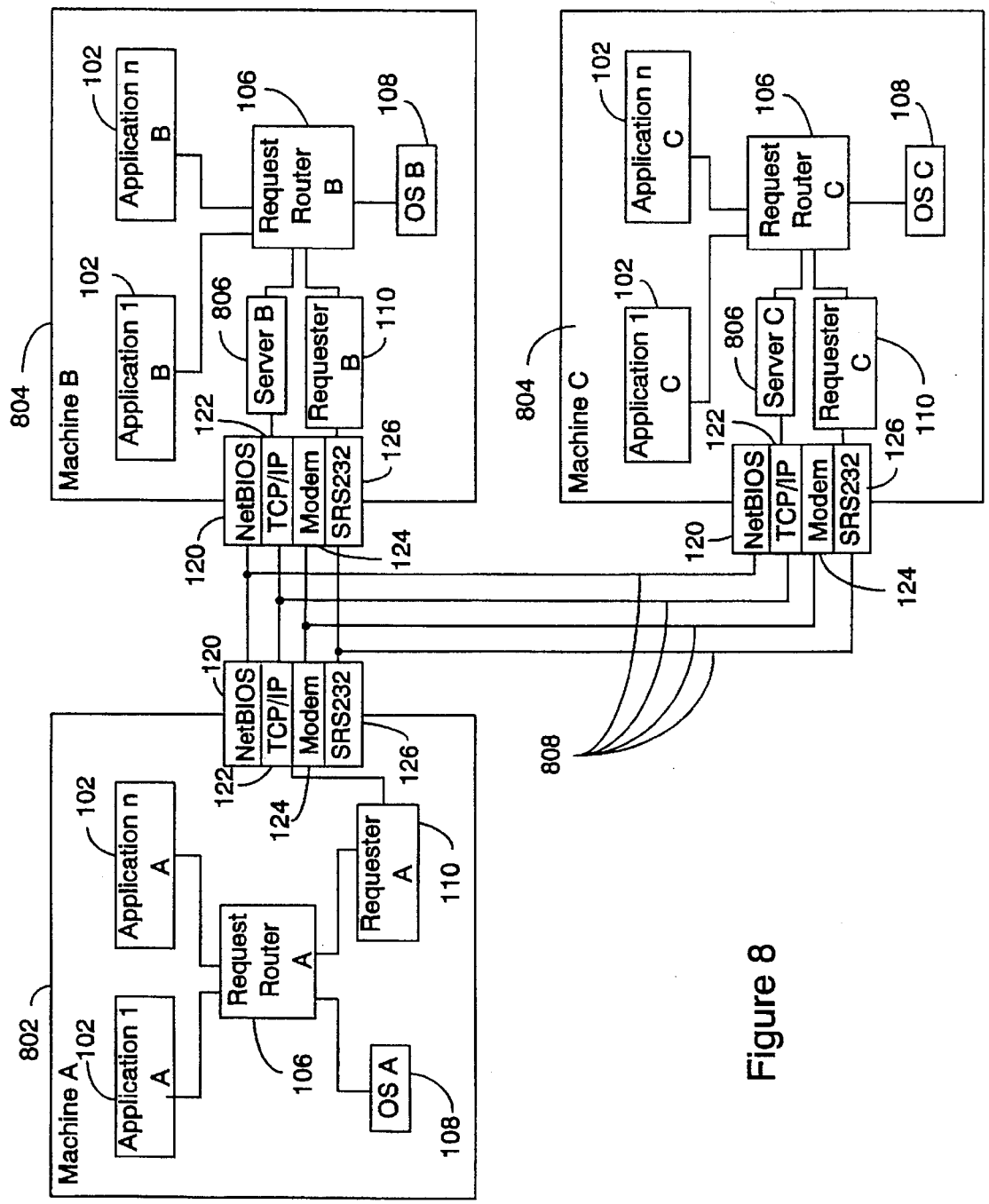
FIG. 8 is a diagram showing a requester (machine A) interconnected with two servers (machines B–C).

FIG. 8 illustrates a configuration in which a system 802 and multiple servers 804 communicate with one another.

Figure 9:
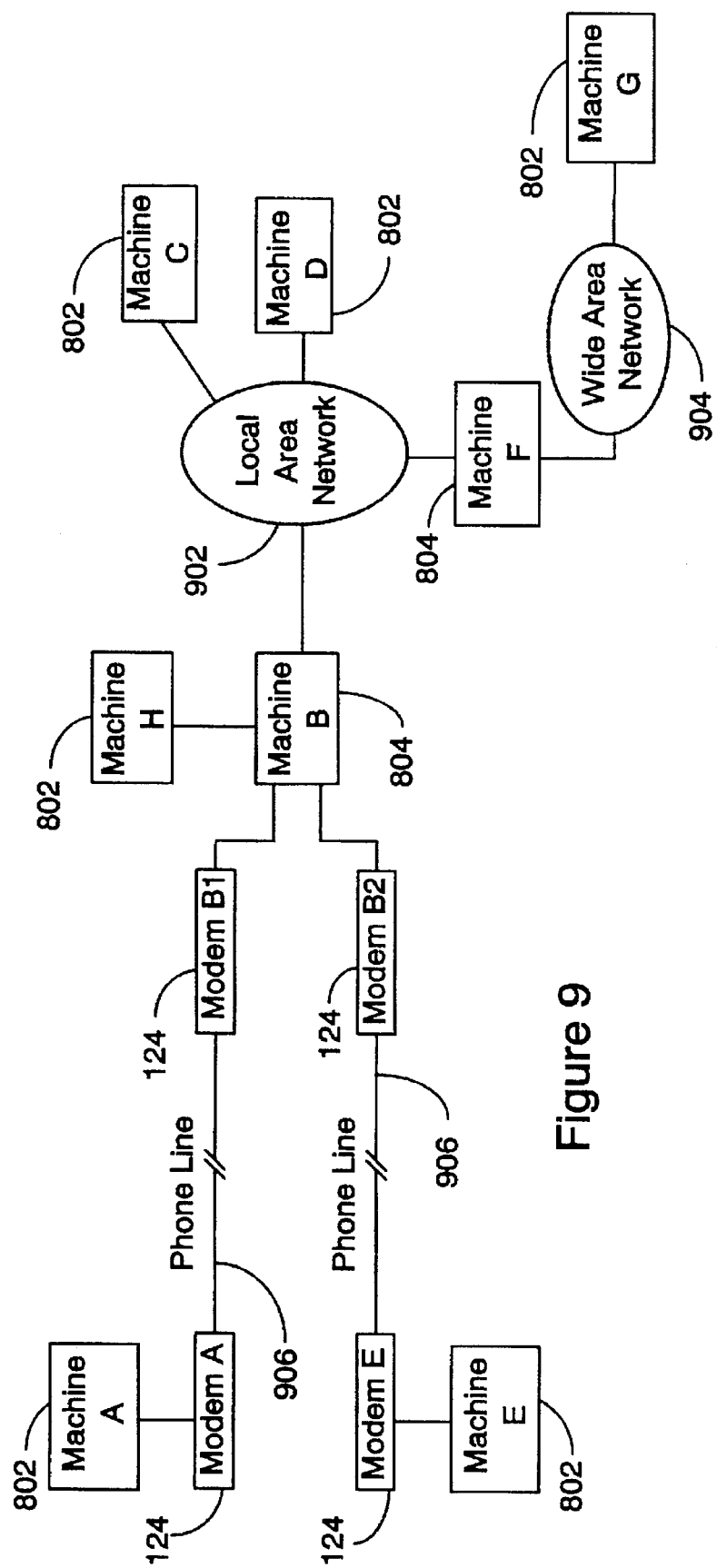
FIG. 9 is a diagram illustrating multiple requesters connected to servers via local area networks (LANs) and wide area networks and public telephone networks.

FIG. 9 illustrates a configuration in which multiple systems 802 and multiple servers 804 communicate with one another via modems 124 over phone lines 906 and also over LANs 902 and wide area networks 904. This figure illustrates the ability of the system to interface with multiple communications protocols.

Figure 10:
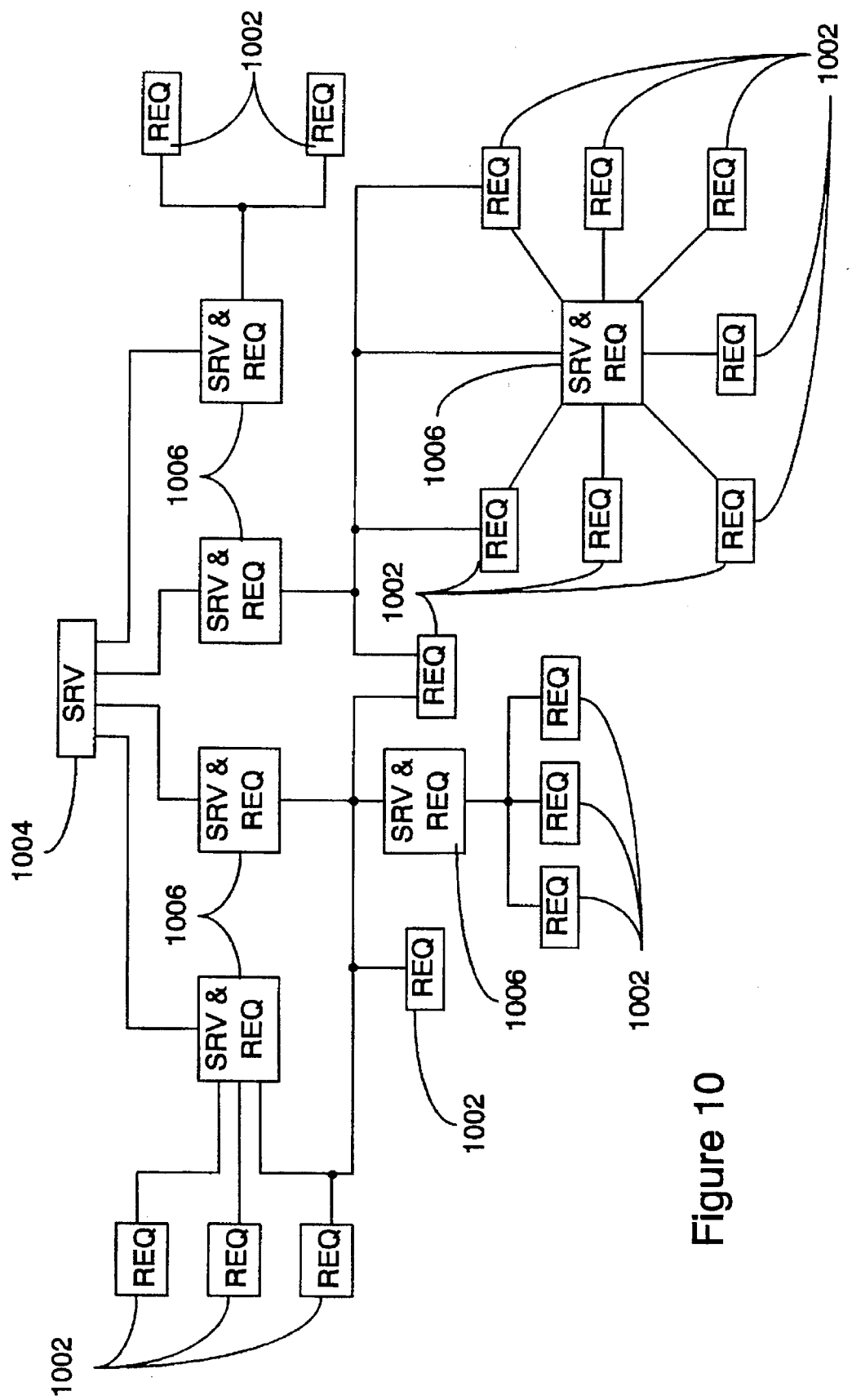
FIG. 10 is a diagram illustrating multiple requesters connected to servers and server/requester systems.

FIG. 10 illustrates a configuration in which multiple requester systems 1002, multiple server systems 1004, and multiple server/requester systems 1006 communicate with one another. The configuration in this figure is similar to that shown in FIG. 9.

Figure 11:
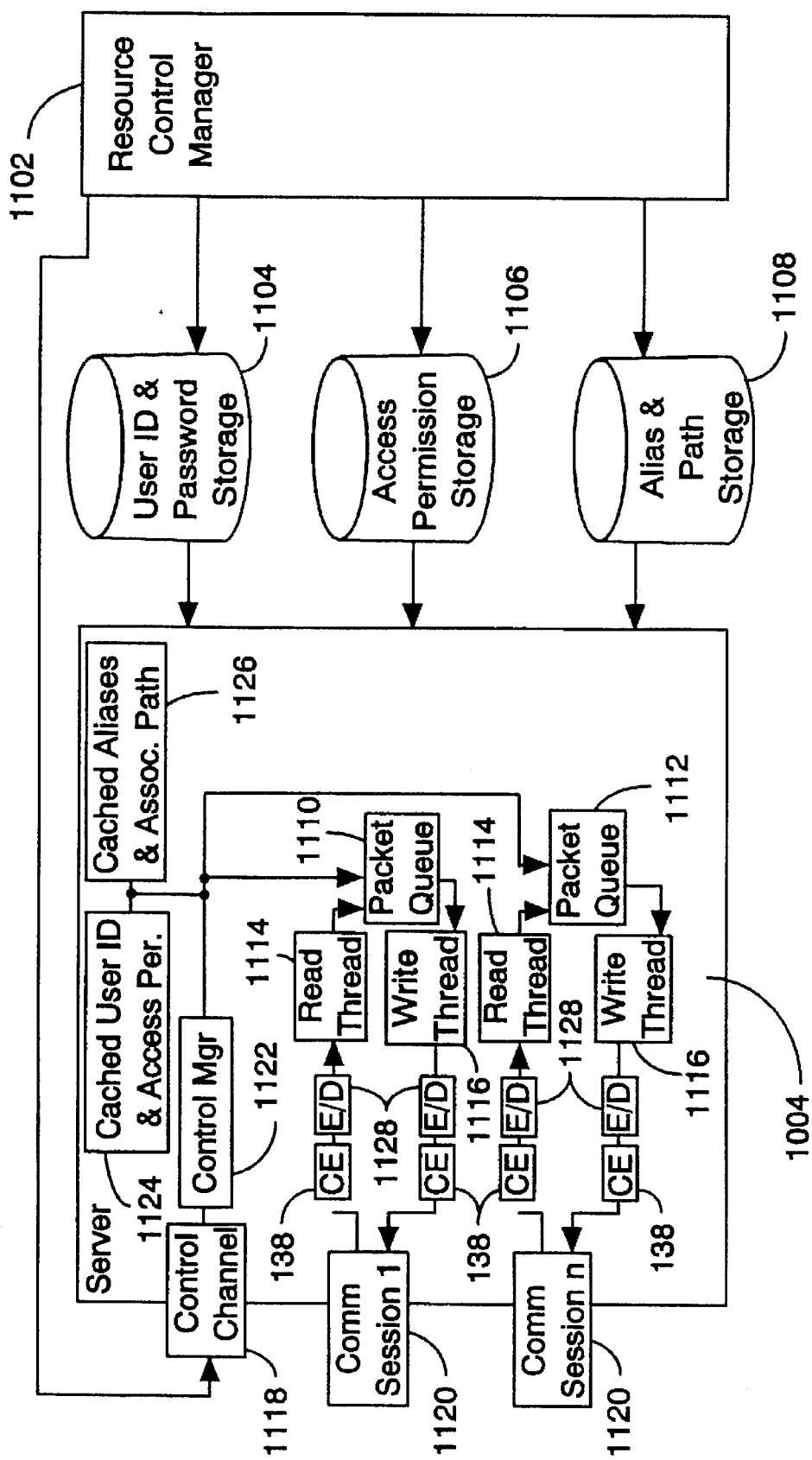
FIG. 11 is a diagram illustrating the server used in the preferred embodiment.
Figure 12:
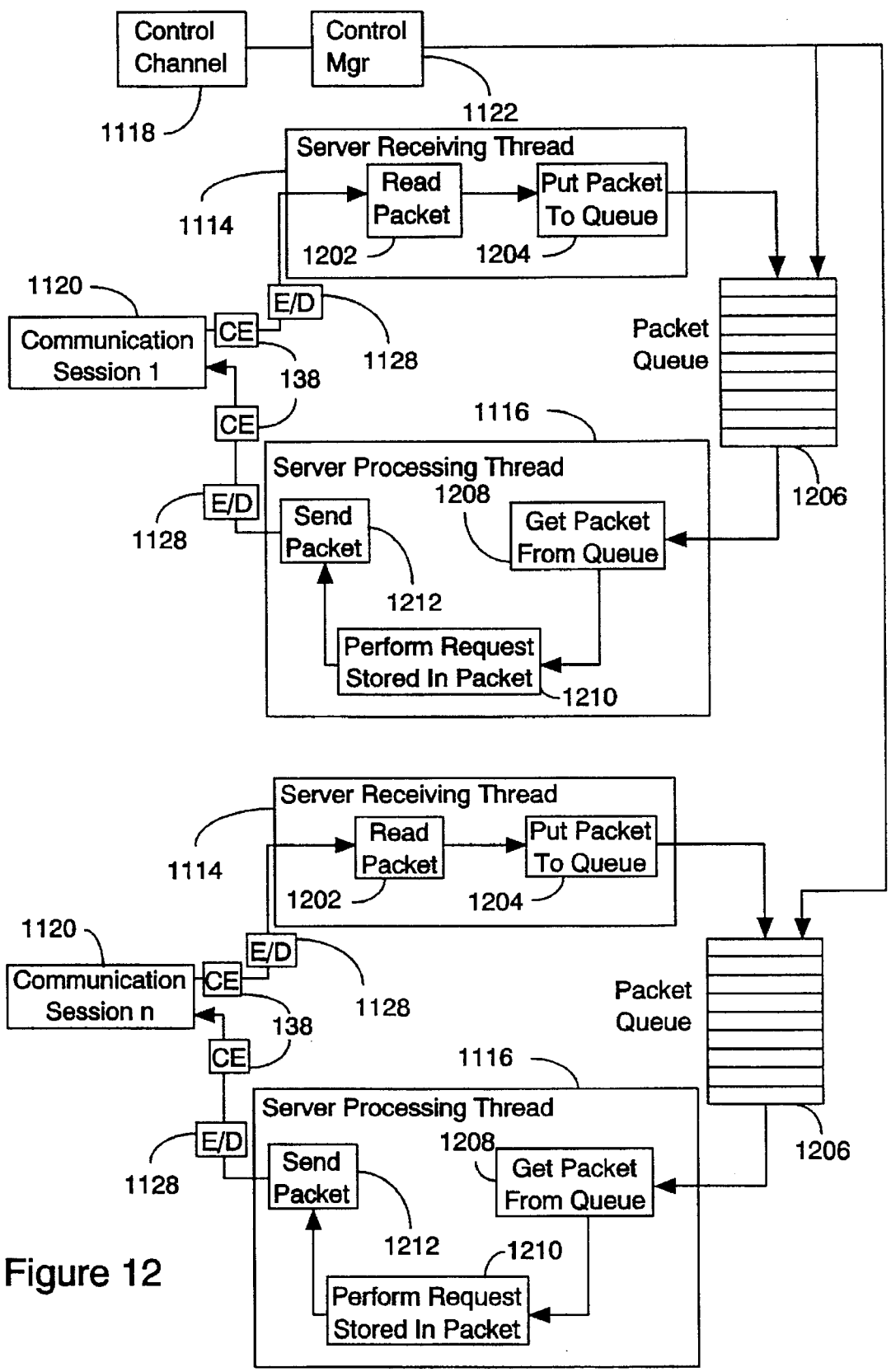
FIG. 12 is a diagram illustrating the read/write threads and packet queues used by the server of FIG. 11.

FIGS. 11 and 12 illustrate a configuration in a server 1004 which includes communication sessions 1120 to communicate with requesters, encrypter/decrypter 1128, read threads 1114, write threads 1116, packet queues 1110, 1112, a resource control manager 1102 to control user ID, access permission and alias and path storage 1104, 1106, 1108. The cached user ID and access permission 1124 and the cached alias and associated path 1126 caches are used to store data from the access permission storage 1106 and the alias and path storage disks 1108 for improved system performance.

To protect resources on the network domains, an access control list (ACL) is used for each network domain in access permission storage 1106. The ACLs are managed by network administrators to define to which resources a user can access and what kind of accesses the user has to each resource. The system provides a sophisticated ACL so that a user cannot view or access any resources other than those assigned. The following access permissions are used by our ACLs:

READ_FILE
WRITE_FILE
CREATE_FILE
DELETE_FILE
EXECUTE_FILE
CHANGE_ATTRIBUTE
ACCESS_SUBDIR
CREATE_SUBDIR
REMOVE_SUBDIR

For example, if the user is not permitted access to any subdirectories from a network resource, the user will not see any subdirectory at all when viewing the network resource. If for some reasons the user knows a particular subdirectory exists under the network resource, he cannot access it anyway. The management of network resources and user access permissions is provided with a user-friendly Graphical User Interface application. Together with the logon procedure, ACLs provide effective protections to the resources on the network domains.

FIG. 12 is a more detailed view of the server 1004 of FIG. 11. A control manager 1122 within the server 1004 is responsible for communication between the server 1004 and other applications on the server 1004 machine. Thus, the server 1004 can be informed if a database has been changed by a resource control application. The server 1004 can also accept a message from another application 102 to send to all or selected clients over active sessions. If an electronic mail system should be needed, the server 1004 can save the message and wait until a client is logged on to send the message over the session. To support these features, the control manager 1122 posts message or e-mail packets to the incoming packet queues 1206 of the sessions 1120. When the server processing threads 1114, 1116 of the sessions 1120 retrieves the packets from the queue 1206, it will process the packets based on the packet types defined in the packet headers.

FIG. 13A–D illustrates the packet headers used in the logon procedure. A session key KS and an initialization vector IV are defined for a communication session between a client and a server 1004 when security level 1 or higher is desired (in security level 0, no encryption is used).

Figure 13A:
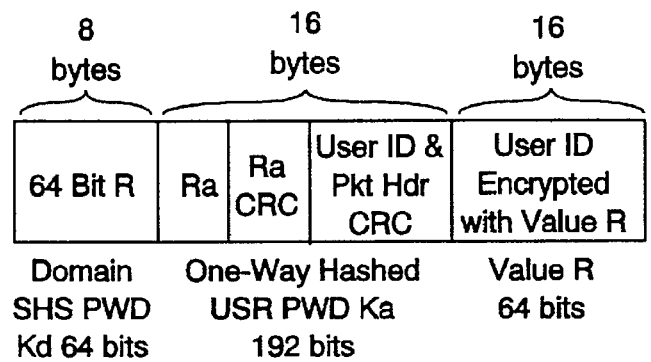
FIG. 13A–D are diagrams illustrating the packet headers used in the logon procedure of the preferred embodiment.
Figure 13B:
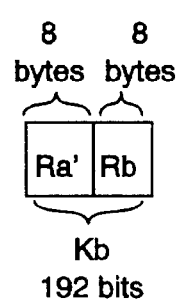
Figure 13C:
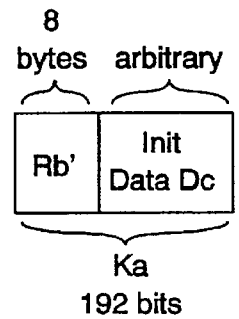
Figure 13D:
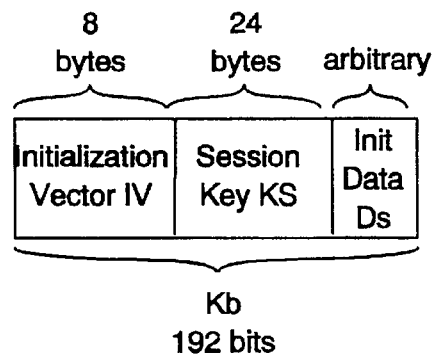
Figure 13E:
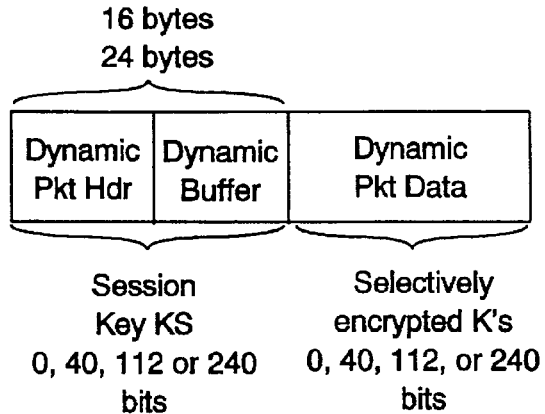
FIG. 13E is a diagram illustrating the packet headers used during data transfer in the preferred embodiment.

FIG. 13E illustrates a normal packet such as those used during data transfer. When an e-mail or message packet is sent, the preferred embodiment uses security level 2 by default to protect the messages. In security level 2, both packet header and data are encrypted using single $s_3$DES encryption.

The requester also has the capability to signal request routers 106 of all applications 102 when a communication session is terminated abnormally whether the request routers 106 are sending request packets or waiting on response packets. In order to perform this feature, the response signals (i.e., the return addresses stored in the request packets) are saved in response-signal queues by the session write thread 1116. Each communication session has a response-signal queue 1206 to reduce the search time. When the response packets are successfully delivered, their corresponding response signals are removed from the queue by the session read threads 1114 of the corresponding communication channels. If an application 102 terminates before its response packets arrive, the response packets are discarded and the response signals are also removed from the queue after all chaining response packets have arrived.

In addition, the read thread of the client session also recognizes different types of packets to determine whether it should route the received packets to the application's request router or to a message manager within the requester. The message manager of the requester is responsible for message and e-mail packets sent from the connected servers. This feature is important because it allows the server to initiate the sending of packets while a session is active. As an example, a hot-link can be defined so that a server can inform the connected clients if a database should be changed or a server administrator can send a message to all or selected clients telling them if a server should be out of service shortly, etc. In a more advanced application, an electronic-mail server application can be written so that the message packets are saved on the server until a client is logged on. At that time, the server will send the saved messages to the connected client.

In the prior art, the requester is the one that translates and formats requests from the applications; thus, it cannot perform preparation ahead of time. In addition, information accumulating in one place could increase the search time. The prior art requires an intrinsics modules in both the application and the requester which may require more resources to be allocated and more machine instructions to be executed. Furthermore, the prior art does not have the capability to accumulate multiple request packets from a requester so that the server can process the next packet request while the previous response packet is traveling back to the requester on the network or being processed by communication devices in their own memory buffers.

In contrast to the prior art, the preferred embodiment contains the formatting and translating code in just one place, the request router 106. The requester only compresses and/or encrypts packet headers and packet data if necessary and then calls the transport functions to send the packets to the server. In addition, requester 110 is also responsible for saving logon and mounting information, managing the communication sessions, and delivering response packets received from multiple network domains to multiple request routers while sending request packets to the multiple network domains. Requester 110 does not need to know the format of the response data, and can deliver the response packets immediately upon receiving them. The request routers 106 can then format or translate the response data in the applications time slices while the requester 110 is waiting for other incoming response packets or reading data from the communication devices 120, 122, 124, 126. Thus, the preferred embodiment achieves better performance than the prior art.

The prior art also requires the intrinsic modules to translate and format the application data from a program stack segment to a parameter block before sending it to its requester where the data is once again formatted or copied into a data communication buffer. In contrast, the request routers 106 in the preferred embodiment format the application data only once and store the formatted data into the write token which will be used by the requester and the communication subsystem to send the request packets to the server. When the response packets arrive, the requester 110 uses the response signals to tell the corresponding request routers that their response packets have arrived. At that time, the request routers 106 transfer response data directly from the read tokens into the application buffers. Thus, the preferred embodiment eliminates the overhead of copying data between memory buffers.

Furthermore, the prior art does not have the dynamic packet header feature to support packet authentication on demand. Neither does its server authenticate the requester to prevent replaying of packets by intruders. The prior art also requires two different programs running on the server to wait for incoming data from different communication protocols. The preferred embodiment only requires the server to be started once for multiple communication protocols.

In general, a session on the server 1004 will support multiple applications on the requester; thus, a server 1004 must somehow remember the resources allocated for the client applications so that these resources can be released whether the client applications terminate abnormally or the communication sessions are destroyed abnormally. Our server supports this feature in each session thread. Since the allocated resources are isolatedly remembered for different requesters, the search time is minimum every time they are added or removed from the memorized list. In addition, security audit can be turned on and off by the network resource manager running on the server over the control channel of the server. The network resource manager can toggle the security audit for users or groups whose IDs are supplied in the auditing request packet, or resources whose names are stored in the auditing request packet. The audit can also be logged based on successful, failed, or both transactions.

In the prior art, the application is the one which determines if a session should be started on the host computer. The application then makes a function call to connect to the host computer and another function call to start a host server process. In the preferred embodiment, the command manager of the requester determines if a connection should be established to couple the client computer to the server computer. Once the connection is established, the server automatically creates a server processing thread to process the client request packets received over the connection. After the connection is established, the command manager also performs the auto-logon itself, not the application. The session can then be shared by all the applications on the client machine.

Thus, the session creation and automatic logon, re-logon or auto-logon are transparent to the applications. If the logon is successful, the server creates a server receiving thread to receive and accumulate request packets in a packet queue so that they will be processed by the server processing thread. When a session disconnect request packet is received, the server receiving and processing threads terminate themselves. However, if the communication session is destroyed abnormally, the server receiving thread simulates a disconnect request packet and appends it to the packet queue to signal the server processing thread to terminate. The server receiving thread then terminates itself.

Note that in the very first logon manually performed by the user, the operation is slightly different than the auto-logon mentioned in the above paragraph. The requester first receives a logon request from the logon application, it establishes the session itself and then performs the logon. This is so done by the command manager of the requester, not by the session manager. The session manager is responsible for dropping the session if no data is transmitted for a certain period of time.

Since request packets are accumulated in the packet queue in the preferred embodiment, the request packets may not be processed immediately upon arrival. In contrast, the prior art must process the request packets immediately to return the status or data to the requester. This may indicate that other applications on the client computer must wait until the return packet has arrived and processed before they can send their requests to the same host computer.

The prior art requires an application to send a function call to the host computer to established a communication session. Our system establishes a communication session by the requester when it receives a logon request from the logon program or a request router asking for the communication handle. In addition, our server has the capability to reformat and retranslate the request packets in its own request router before forwarding them to the requester located on the server when the network resources do not reside on the server. That is, multiple servers can be connected together as shown in FIGS. 7-10 to expand the amount of network resources available to requesters. Note that this feature requires the intermediate servers administrator(s) to manually logon the designated servers since the logon passwords are not stored on the intermediate servers. Users on requesters can perform this logon remotely if their access permissions in the ACLs of the intermediate servers indicate that they can execute programs on the intermediate servers. However, caution must be taken and security level 3 is advised when using this feature since logon user IDs and passwords must be sent along with the executing request packets.

As shown earlier, the very first logon packet is encrypted with three different keys for different parts of the packet. The header of the logon packet is encrypted with a key generated from the server name. This is design to detect outside intruders early in the verification process. For intruders working inside an organization, the server name may be known. Then it comes the middle part of the logon packet which contains the 64-bit random number and the CRC value. These are the heart of the verification since it is encrypted with the key generated from the user ID and the secret password. This scheme allows the server to detect the intruding logon right on the very first packet. The challenge-response process that following the logon packet is to defeat re-played packets.

The encryption system used in the preferred embodiment has several other advantages, as follows. The long term key is derived from a user ID and a secret password. It has 192 bits and is used in a $s^3$DES encryption enhanced with Cipher Block Chaining (CBC) mode. The short term key is generated with a formula similar but more secure than the one suggested in X9.17 and changed every time a session is established between two nodes on the network. Thus, the encryption occurs at the application layer which exposes the source and destination addresses of the packets when used with TCP/IP and NetBIOS protocols but the intruders must deal with different keys whose lengths are either 40, 112 or 240 bits for different pair of nodes on the network. In addition, the short term key is encrypted and only sent once when the communication session between two nodes is established, not in every packet; thus, it reduces the traffic between two nodes.

Furthermore, the prior art only protects date between site-firewalls, not between nodes. In many cases, data must be protected between nodes within an organization. For instance, high-rank management officers within a private network may want to exchange restricted confidential information without leaks to their employees.

Encryption at the application layer also reduces the cost of replacing the existing network layer and can be done on demand when protection to data is needed. Different security firewalls can easily be established between any pair of nodes with a single click of the fingertip.

Figure 14C:
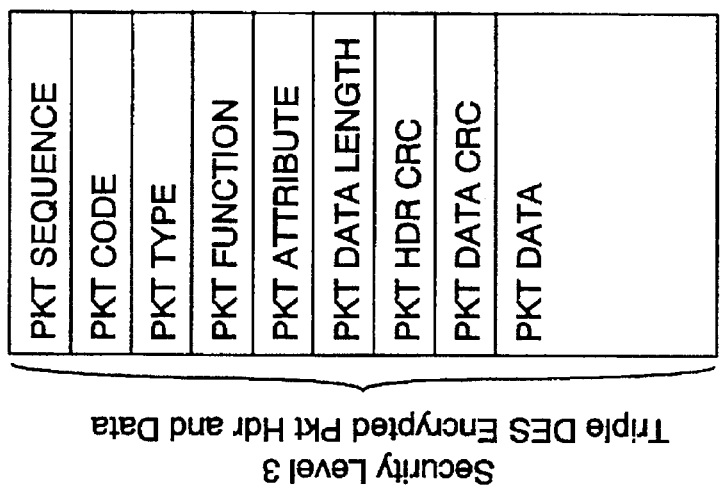
FIGS. 14A–C are diagrams of an alternative preferred embodiment of the memory layout of the packet structures.
Figure 14B:
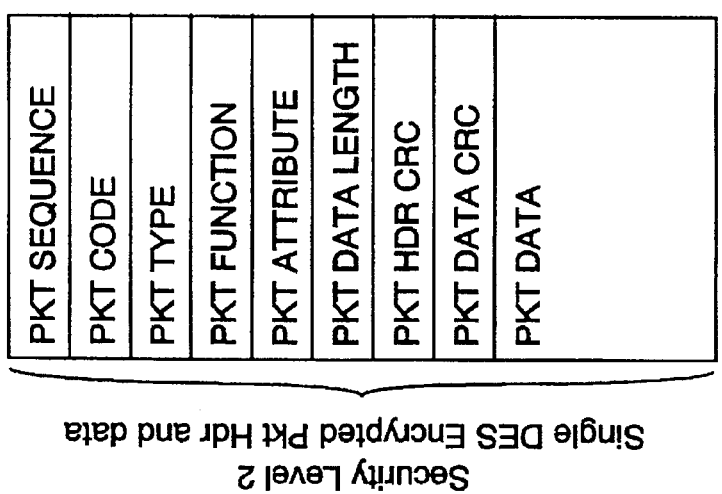
Figure 14A:
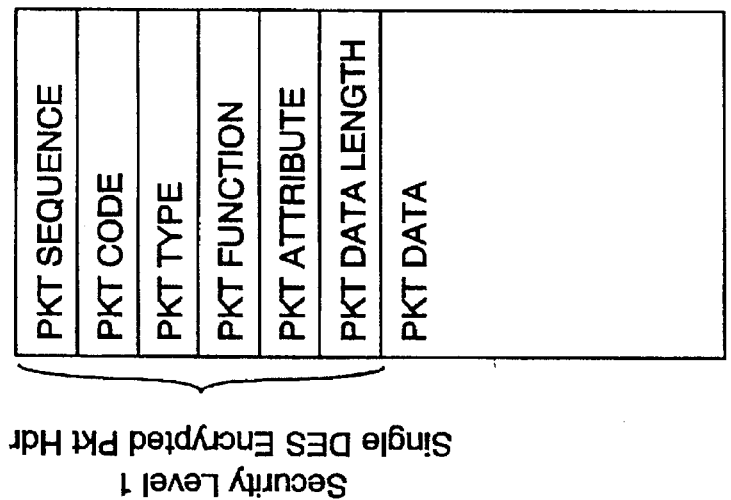

FIGS. 14A–C and 15A–E illustrate an alternative preferred embodiment of the invention. FIGS. 14A–C illustrate the memory layout of the packets used in the alternative preferred embodiment. FIGS. 14A–C differ from the memory layout shown in FIGS. 4A–C in that the "PKT VERSION FIELD" has been deleted. This reduces the amount of data to be transferred in the packets which in turn reduces storage requirements and improves performance. FIG. 15A–D illustrate the packet structures used in the logon procedure of the alternative preferred embodiment. A session key KS and an initialization vector IV are defined for a communication session between a client and a server 1004 when security level 1 or higher is desired.

Figure 15A:
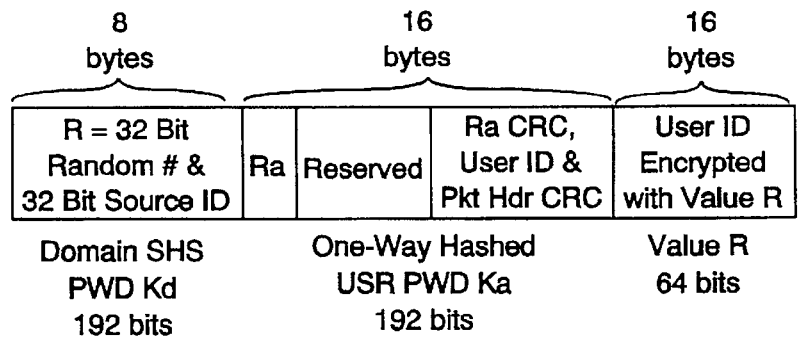
FIG. 15A–D are diagrams illustrating the logon packet structures used in the logon procedure of the alternative preferred embodiment.
Figure 15B:
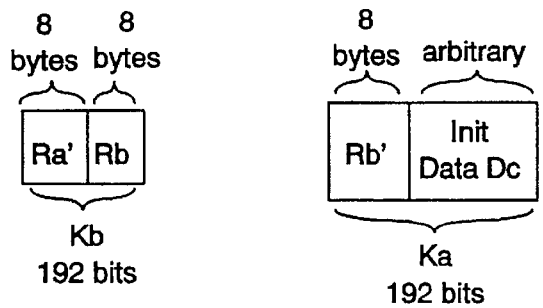
Figure 15C:
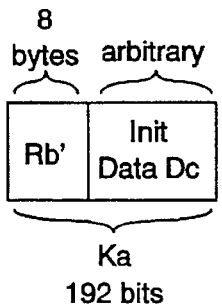
Figure 15D:
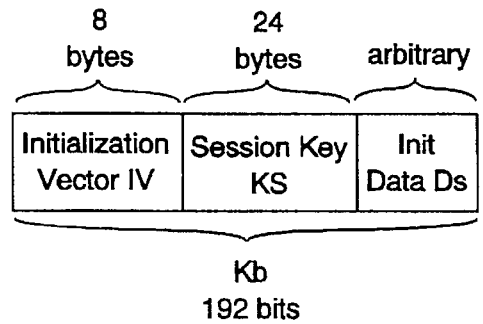
Figure 15E:
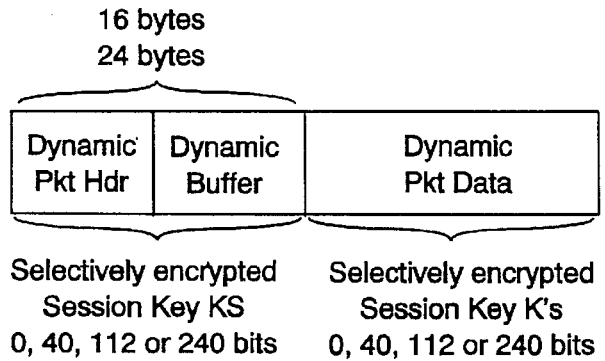
FIG. 15E is a diagram illustrating the packet structure used during data transfer in the alternative preferred embodiment.

FIG. 15E illustrates a normal packet structure such as that used during data transfer, when a $s^3$DES algorithm is in use. Its S-boxes are cryptographically modified and selected based on a given key. In the preferred embodiment, the random numbers Ra and Rb are XOR'ed to by both client and server to generate a key for the S-boxes. Thus, security of data exchanged over the communication channel is not only dependent to the session encryption key but also to the S-box key.

In FIG. 15A, the 64 bit R field in the beginning of the header includes a 32 bit constant which identifies the source system of the packet. The R field is used as a key to encrypt the 16 byte field which holds the User ID. For use in international communications, the high order 24 bits can be set to zero. By so doing, the level of encryption security can be reduced to comply with United States laws governing encrypted communications.

The logon procedure facilitates a three-way authentication to prevent the password from being transferred over the network and allows both client and server to authenticate each other as well as detecting packet replaying. First, the client generates a 32-bit random number V concatenated by a predefined 32-bit constant to form a 64-bit number R. This 64-bit random R is used as a $s^3$DES key to encrypt the user ID to make the user ID look random for every logon packet. Then the client generates a 64-bit key K from the server name to encrypt the 64-bit value R. Now, the client generates a 192 bit key Ka from the user ID and password using a one-way hash function such as the Secure Hash Standard (SHS) specified in the Federal Information Processing Standards Publication 180 (FIPS PUB 180). It then generates a 64-bit random number Ra, calculates the CRC signature C whose initial value is the random number V and consisting of the random number Ra, the original user ID, and the random number R. The client then encrypts the random number Ra and the signature C using the key Ka. Thus, the very first logon packet is encrypted with three different keys for different parts of the packet (see FIG. 13A–D).

When the server receives the first logon request packet, it generates a key K2 from its machine name and the SHS to decrypt the packet header for verification. If the packet header does not contain the predefined constant, the user has selected a wrong server, i.e., the user tries to access the server over the phone line but does not know the server name since the phone number is a public record but the server name is a private one. However, if the packet header contains valid data, the server uses the decrypted 64-bit packet header as a key to decrypt the user ID. The user ID is then used to search a database for an access record. If the access record cannot be found, the user has entered an invalid ID and the session is terminated. However, if the access record is found, the server verifies if the user is allowed to access the network resources on this date and at this time.

After the access date and time are verified, the server will retrieve the associated one-way-hashed password Kb from an encrypted password file to decrypt the random number Ra and the CRC signatures. The key Kk used to decrypt the password file is selected by the server administrator at installation. The key must be entered every time the server process is started since it is not stored on the system.

Now, the first logon packet is decrypted. The server calculates the CRC signature of the random number Ra, the user ID, and the random number R. If the calculated signatures match with the decrypted signatures C stored in the packet, the server manipulates the client random number Ra with a predefined formula to form Ra', generates a random number Rb, and encrypts both random numbers Ra' and Rb with the password Kb before sending the second logon packet to the client.

After the client decrypts the first logon response packet, it manipulates the random number Ra with the predefined formula and compares it against the one returned from the server. If the numbers match, the client knows that it communicates with a correct server, not a fraud server where an eavesdropper has set up to echo back captured packets. The client now manipulates the random number Rb with another predefined formula to form Rb' and concatenates it with the client's initiating data, i.e., the client initial packet sequence number and the encryption mode for the session, to form a second logon packet. The client then masks the initial data with the random number Ra to hide the possibly known text, encrypts the third logon packet and sends it to the server. Note that the client starts to send its initial data to the server only if the random number Ra' is verified to ensure that the server is a trusted party.

After decrypting the third logon packet, the server also manipulates the random number Rb with the same predefined formula used by the client and verifies if the random numbers are matched to assure that it communicates with a correct client. If the random numbers match, the server knows that it is communicating with an authorized client and the first logon packet was not a replayed packet. The server then saves the client initiating data, generates a session key Ks and an initialization vector IV with the formula similar but more secure than the one specified in Appendix C of the ANSI X9.17 standard, encrypts and sends them to the client. Along with the session key Ks and the IV, the server also sends its initiating data (i.e., the server initial packet sequence number, approved encryption or compression method). The client and server initial packet sequence numbers are used to detect packet deletion and insertion for data exchanged after the logon procedure. The server initial data is also masked with the client random number Ra to hide possibly known text. Note also that the server only sends its initial data after the number Rb is verified to ensure the client is a valid party random number.

After decrypting the third logon packet, the client now saves the session key Ks and the IV in its own memory for future communication with the server. To improve performance, the client and server build encryption and decryption key schedules of $s^3$DES and stores them in the session information block structure as shown in FIGS. 5A-B. The S-boxes of $s^3$DES are also combined with the P-box of DES algorithm to further enhance encryption speed. As described so far, the authentication techniques not only provide a secure identification procedure, but also a secure negotiation protocol to set up communication sessions (i.e, encryption method, compression method, operating platform, language, etc.).

As appreciated, the following symbols may help to clarify the logon procedure:

1. A→B: EK(R)+EKa(Ra,f(Ra,R,UID))+ER(UID)
2. A←B: EKb(Ra',Rb)
3. A→B: EKa(Rb',Dc)
4. A←B: EKb(IV,Ks,Ds)

where:

A—a requester

B—a server

E—a symmetric cryptosystem such as DES or $s^3$DES

K—an encryption key generated from the server name

R—a 32-bit random number concatenated by a predefined constant

Ka—a 192-bit key one-way hashed from the user ID and password

Ra—a 64-bit random value generated by A f( )—a hash function such as CRC to calculate the signature UID—a user ID Kb—a 192-bit one-way hashed key retrieved from a database ha( )—a hash function to manipulate the random number Ra Rb—a 64-bit random value generated by B hb( )—a hash function to manipulate the random number Rb Dc—client initial data masked with Ra IV—an initial chaining vector for encryption in CBC mode Ks—a session encryption key Ds—server initial data masked with Ra Ra'—ha(Ra)

Rb'—hb(Rb)

After the logon procedure is completed, the random numbers Ra and Rb are XOR'ed by both the client and server to generate a key for the S-boxes used by DES or $s^3$DES. The key-dependent S-boxes will make DES and $s^3$DES harder to cryptanalyze since the key length is longer. Thus, every communication session will have a different session key and different S-boxes to be used by DES and $s^3$DES in addition to the IV.

Variants of the S-boxes, such as $s^3$DES S-boxes can be used in place of DES S-boxes to provide improved security. An example of such S-boxes are included in Table 1, below. In table 1, the $s^3$DES S-box 1 and S-box 2 are reversed from an original $s^3$DES S-box configuration.

TABLE 1

S-box 1:

| 13 | 14 | 0  | 3  | 10 | 4  | 7  | 9 | 11 | 8  | 12 | 6  | 1  | 15 | 2  | 5  |
|----|----|----|----|----|----|----|---|----|----|----|----|----|----|----|----|
| 8  | 2  | 11 | 13 | 4  | 1  | 14 | 7 | 5  | 15 | 0  | 3  | 10 | 6  | 9  | 12 |
| 14 | 9  | 3  | 10 | 0  | 7  | 13 | 4 | 8  | 5  | 6  | 15 | 11 | 12 | 1  | 2  |
| 1  | 4  | 14 | 7  | 11 | 13 | 8  | 2 | 6  | 3  | 5  | 10 | 12 | 0  | 15 | 9  |

S-box 2:

| 15 | 8  | 3  | 14 | 4  | 2  | 9  | 5 | 0  | 11 | 10 | 1  | 13 | 7  | 6  | 12 |
|----|----|----|----|----|----|----|---|----|----|----|----|----|----|----|----|
| 6  | 15 | 9  | 5  | 3  | 12 | 10 | 0 | 13 | 8  | 4  | 11 | 14 | 2  | 1  | 7  |
| 9  | 14 | 5  | 8  | 2  | 4  | 15 | 3 | 10 | 7  | 6  | 13 | 1  | 11 | 12 | 0  |
| 10 | 5  | 3  | 15 | 12 | 9  | 0  | 6 | 1  | 2  | 8  | 4  | 11 | 14 | 7  | 13 |

S-box 3:

| 13 | 3 | 11 | 15 | 14 | 8 | 0 | 6 | 4 | 15 | 1 | 12 | 7 | 2 | 10 | 9 |

TABLE 1-continued

| 4 | 13 | 1 | 8 | 7 | 2 | 14 | 11 | 15 | 10 | 12 | 3 | 9 | 5 | 0 | 6 |
|---|---|---|---|---|---|---|---|---|---|---|---|---|---|---|---|
| 6 | 5 | 8 | 11 | 13 | 14 | 3 | 0 | 9 | 2 | 4 | 1 | 10 | 7 | 15 | 12 |

S-box 4:

| 9 | 0 | 7 | 11 | 12 | 5 | 10 | 6 | 15 | 3 | 1 | 14 | 2 | 8 | 4 | 13 |
|---|---|---|---|---|---|---|---|---|---|---|---|---|---|---|---|
| 5 | 10 | 12 | 6 | 0 | 15 | 3 | 9 | 8 | 13 | 11 | 1 | 7 | 2 | 14 | 4 |
| 10 | 7 | 9 | 12 | 5 | 0 | 6 | 11 | 3 | 14 | 4 | 2 | 8 | 13 | 15 | 1 |
| 3 | 9 | 15 | 0 | 6 | 10 | 5 | 12 | 14 | 2 | 1 | 7 | 13 | 4 | 8 | 11 |

S-box 5:

| 5 | 15 | 9 | 10 | 0 | 3 | 14 | 4 | 2 | 12 | 7 | 1 | 13 | 6 | 8 | 11 |
|---|---|---|---|---|---|---|---|---|---|---|---|---|---|---|---|
| 6 | 9 | 3 | 15 | 5 | 12 | 0 | 10 | 8 | 7 | 13 | 4 | 2 | 11 | 14 | 1 |
| 15 | 0 | 10 | 9 | 3 | 5 | 4 | 14 | 8 | 11 | 1 | 7 | 6 | 12 | 13 | 2 |
| 12 | 5 | 0 | 6 | 15 | 10 | 9 | 3 | 7 | 2 | 14 | 11 | 8 | 1 | 4 | 13 |

S-box 6:

| 4 | 3 | 7 | 10 | 9 | 0 | 14 | 13 | 15 | 5 | 12 | 6 | 2 | 11 | 1 | 8 |
|---|---|---|---|---|---|---|---|---|---|---|---|---|---|---|---|
| 14 | 13 | 11 | 4 | 2 | 7 | 1 | 8 | 9 | 10 | 5 | 3 | 15 | 0 | 12 | 6 |
| 13 | 0 | 10 | 9 | 4 | 3 | 7 | 14 | 1 | 15 | 6 | 12 | 8 | 5 | 11 | 2 |
| 1 | 7 | 4 | 14 | 11 | 8 | 13 | 2 | 10 | 12 | 3 | 5 | 6 | 15 | 0 | 9 |

S-box 7:

| 4 | 10 | 15 | 12 | 2 | 9 | 1 | 6 | 11 | 5 | 0 | 3 | 7 | 14 | 13 | 8 |
|---|---|---|---|---|---|---|---|---|---|---|---|---|---|---|---|
| 10 | 15 | 6 | 0 | 5 | 3 | 12 | 9 | 1 | 8 | 11 | 13 | 14 | 4 | 7 | 2 |
| 2 | 12 | 9 | 6 | 15 | 10 | 4 | 1 | 5 | 11 | 3 | 0 | 8 | 7 | 14 | 13 |
| 12 | 6 | 3 | 9 | 0 | 5 | 10 | 15 | 2 | 13 | 4 | 14 | 7 | 11 | 1 | 8 |

S-box 8:

| 13 | 10 | 0 | 7 | 3 | 9 | 14 | 4 | 2 | 15 | 12 | 1 | 5 | 6 | 11 | 8 |
|---|---|---|---|---|---|---|---|---|---|---|---|---|---|---|---|
| 2 | 7 | 13 | 1 | 4 | 14 | 11 | 8 | 15 | 12 | 6 | 10 | 9 | 5 | 0 | 3 |
| 4 | 13 | 14 | 0 | 9 | 3 | 7 | 10 | 1 | 8 | 2 | 11 | 15 | 5 | 12 | 6 |
| 8 | 11 | 7 | 14 | 2 | 4 | 13 | 1 | 6 | 5 | 9 | 0 | 12 | 15 | 3 | 10 |

The generated S-boxes can further be combined by the P-Box of the DES algorithm specified in FIPS 41 to speed up the encryption process. These condensed SP-Boxes are stored in the memory as shown in FIGS. 5A and 5B.

The $s^3$DES encryption method disclosed above can be used in several alternative embodiments, each of which provides distinct advantages. For example, each client in a system can have its own set of $s^3$DES S-boxes so that data is encrypted differently for each session. Therefore, even if the $s^3$DES S-box encryption table data was deciphered for one client, the other clients would still be protected because their encrypted data are different.

Another method of improving security is accomplished by storing the $s^3$DES S-box encryption table in alterable storage, such as system memory, PROMs, EPROMs, etc. The client and server can selectively update the $s^3$DES S-box encryption table data between communication sessions or when otherwise convenient. An advantage associated with this technique is that since the system can change the $s^3$DES S-box encryption table between communication sessions, the client is protected on subsequent logons from intruders who deciphered the $s^3$DES S-box encryption table from the previous session.

There are both legal restrictions and costs associated with the use of encryption codes. For example, U.S. law prohibits encryption techniques which are difficult to break from being exported to foreign countries. Likewise, the longer the encryption code, the more resources the code requires to decipher. By masking the leading bits in the session key to zero, the code can effectively be altered to shorter lengths. In addition to complying with U.S. law, this also allows the server to provide different security levels to different clients. For example, a domestic client may have a higher level code for data transmission within the United States while a foreign client would have a lower security level due to a masking of bits in the session key.

The server can examine the source system identification provided by the client during the logon procedure. If the client requests an unauthorized security level, the server can reset the security level to a permitted level of security for that particular client.

Other performance enhancements can be realized by sending multiple requests from a client system to a server in a single transmission. In addition, system performance can also be improved by preventing subsequent packet data from being transmitted between a server and a client until the previous packet data has been responded to Requestors can batch application work within the client machine and communicate with the remote server resulting in remote batching. As a result, the requestor acts as a remote server function. This function is done asynchronously to enhance performance.

Finally, the communication subsystem of the preferred embodiments are a foundation for multiple applications when their uses are in demand. With just one communication session between a client and a server, packet sending can be initiated by either party to conduct file transfers, broadcast messages, or E-mail messages. In addition to minimum resources and maximum performance, security is also provided to protect the secret of the data.

The preferred embodiment envisions a security system based on $s^3$DES S-box encryption, and for ease of discussion, $s^3$DES S-box encryption was used in the foregoing discussion. However, alternative S-box encryption methods, such as DES S-box encryption, can be substituted.

While the invention has been described with respect to a preferred embodiment thereof, it will be understood by those skilled in the art that various changes in detail may be made therein without departing from the spirit, scope, and teaching of the invention. For example, the size of encryption keys can be changed, algorithms used to generate the encryption keys can be changed, the device can be implemented in hardware or software, etc. Accordingly, the invention herein disclosed is to be limited only as specified in the following claims.

I claim:

1. A method of securely transmitting packet data between a client and a server with packets encrypted by S-box data, including the steps of:

using at least one communication channel to transmit packets between at least one client and a server;

encrypting in the client a first logon packet including information identifying the client source system and transmitting the first logon packet to the server;

decrypting the first logon packet in the server;

encrypting a second logon packet in the server with client authenticating information and transmitting the second logon packet to the client;

decrypting the second logon packet in the client;

encrypting in the client a third logon packet with session information and transmitting the second logon packet to the server;

decrypting the third logon packet in the server;

encrypting a fourth logon packet in the server with session information and transmitting the fourth logon packet to the client; and decrypting the fourth logon packet in the client;

transmitting encrypted data packets between the client and server which are encrypted using S-box encryption;

whereby the client and server can establish secure communications by bi-directionally transmitting encrypted data.

2. A method, as in claim 1, wherein a plurality of clients are communicating with the server and each client's data packets are encrypted with a different S-box table data.

3. A method, as in claim 2, wherein a new S-box is selected for a client each time the client establishes a connection with the server.

4. A method, as in claim 3, including the further steps of:

storing the S-box encryption table data in updatable storage;

selectively altering the S-box data.

5. A method as in claim 3, including the further steps of:

using the S-box table in updatable storage to encrypt data;

selectively altering the S-box data with a key chosen by both client and server.

6. A method, as in claim 1, including the further steps of:

storing the S-box encryption table data in updatable storage;

selectively altering the S-box data.

7. A method, as in claim 1, including the further steps of:

using at least two selectable encryption schemes, including at least a first encryption scheme for a first security level and at least a second encryption scheme for a second security level; and the server determines if the security level requested by a client is authorized and if the security level is unauthorized, the server reduces the security level to a permissible level.

8. A method, as in claim 7, including the further steps of:

using the S-box table in updatable storage to encrypt data;

selectively altering the S-box data with a key chosen by both client and server.

9. A method, as in claim 7, wherein a plurality of clients are communicating with the server and each client's data packets are encrypted with different S-boxes.

10. A method, as in claim 9, wherein a new S-box is selected for a communication session by both the client and the server each time the client establishes a connection with the server.

11. A method, as in claim 10, including the further steps of:

storing the S-box encryption table data in updatable storage;

selectively altering the S-box data.

12. A method, as in claim 10, including the further steps of:

using the S-box table in updatable storage to encrypt data;

selectively altering the S-box data with a key chosen by both client and server.

13. A method, as in claim 9, wherein data packets from multiple clients are sent to the server in a single transmission.

14. A method, as in claim 13, wherein a new $s^3$DES S-box is selected for a communication session by both the client and the server each time the client establishes a connection with the server.

15. A method, as in claim 14, wherein succeeding data packets from a client are continuously sent to the server via a write thread and responses from the server are continuously received via a read thread.

16. A method, as in claim 15, including the further steps of:

using the S-box table in updatable storage to encrypt data;

selectively altering the S-box data with a key chosen by both client and server.

17. A method, as in claim 9, wherein succeeding data packets from a client are continuously sent to the server via a write thread and responses from the server are continuously received via a read thread.

18. A method, as in claim 17, including the further steps of:

storing the S-box encryption table data in updatable storage;

selectively altering the S-box data.

19. A method, as in claim 17, including the further steps of:

using the S-box table in updatable storage to encrypt data;

selectively altering the S-box data with a key chosen by both client and server.

20. A method, as in claim 1, including the further steps of:

using the S-box table in updatable storage to encrypt data;

selectively altering the S-box data with a key chosen by both client and server.

* * * * *